(12) United States Patent
Alves et al.

(10) Patent No.: US 12,316,235 B2
(45) Date of Patent: May 27, 2025

(54) TRANSFORMER ARRANGEMENT AND METHOD FOR VOLTAGE CONVERSION INCLUDING A TRANSFORMER AND A CONVERTER COUPLING

(71) Applicant: Hitachi Energy Ltd, Zürich (CH)

(72) Inventors: Roberto Alves, Västerås (SE); Panagiotis Bakas, Västerås (SE); Jan Svensson, Västerås (SE); Muhammad Nawaz, Bro (SE); Seyed Ali Mousavi, Västerås (SE); Daniel Johannesson, Västerås (SE); Peter Steimer, Ehrendingen (CH)

(73) Assignee: Hitachi Energy Ltd, Zurich (CH)

( * ) Notice: Subject to any disclaimer, the term of this patent is extended or adjusted under 35 U.S.C. 154(b) by 114 days.

(21) Appl. No.: 18/023,116

(22) PCT Filed: Oct. 4, 2021

(86) PCT No.: PCT/EP2021/077275
§ 371 (c)(1),
(2) Date: Feb. 24, 2023

(87) PCT Pub. No.: WO2022/073919
PCT Pub. Date: Apr. 14, 2022

(65) Prior Publication Data
US 2023/0327571 A1 Oct. 12, 2023

(30) Foreign Application Priority Data
Oct. 5, 2020 (EP) .................................. 20200063

(51) Int. Cl.
*H02M 5/12* (2006.01)

(52) U.S. Cl.
CPC ..................................... *H02M 5/12* (2013.01)

(58) Field of Classification Search
CPC .. H02M 3/1582; H02M 3/1584; H02M 3/285; H02M 3/33561; H02M 7/49;
(Continued)

(56) References Cited

U.S. PATENT DOCUMENTS 4,623,834 A   11/1986   Klingbiel et al.
10,432,142 B2* 10/2019  Kwan ....................... H03L 7/08
(Continued)

FOREIGN PATENT DOCUMENTS

CN   105186902 A   12/2015
EP     2372893 A1  10/2011
(Continued)

OTHER PUBLICATIONS

English Translation of prior art based on IDS, ES 2219145 (Year: 2004).*

(Continued)

*Primary Examiner* — Sean Kayes
*Assistant Examiner* — Nusrat Quddus
(74) *Attorney, Agent, or Firm* — Sage Patent Group

(57) ABSTRACT

A transformer arrangement includes a first and a second arrangement side and a transformer with first windings coupled to the first arrangement side and with second windings having a first to a fourth tap. The transformer arrangement comprises a converter coupling the first, second and third tap to the second arrangement side, a first filter circuit coupling the first tap to the third tap and a second filter circuit coupling the third tap to the second tap.

16 Claims, 20 Drawing Sheets

(58) Field of Classification Search
CPC ........ H02M 1/045; H02M 7/006; H02M 7/06;
H02M 7/068; H02M 7/153; H02M 7/10;
H02M 1/088; H02M 7/103; H02M 7/106;
H02M 7/19; H02M 7/08; H02M 7/17;
H02M 2001/007; H02M 7/493; H02M
7/53806; H02M 7/5381; H02M 7/483;
H02M 7/217; H02M 7/538466; H02M
7/5387; H02M 7/53871; H02M 7/53873;
H02M 7/53875; H02M 1/084; H02M
1/0845; H02M 5/40; H02M 5/42; H02M
5/453; H02M 7/7575; H02M 5/458;
H02M 5/45; H02M 5/4585; H02M
5/4505; H02M 5/451; H02M 5/452;
H02M 5/447; H02M 5/456; H02M 1/12;
H02M 1/4266; H02M 2001/123; H02M
3/073; H02M 3/10; H02M 3/135; H02M
3/137; H02M 3/28; H02M 3/315; H02M
3/3155; H02M 3/325; H02M 3/335;
H02M 7/515; H02M 7/521; H02M 7/53;
H02M 7/537; H02M 7/5383; H02M
7/53862; H02M 7/757; H02M 7/79;
H02M 3/337; H02M 3/338; H02M
3/3382; H02M 3/3384; H02M 7/538;
H02M 7/53832; H02M 7/53835; H02M
7/487; H02M 7/539; H02M 7/23; H02M
7/21; H02M 7/12; H02M 7/04; H02M
7/00; H02M 1/32; H02M 2001/322;
H02M 2001/327; H02M 1/34; H02M
2001/342; H02M 2001/344; H02M
2001/346; H02M 2001/348; H02M 1/36;
H02M 1/38; H02M 1/42; H02M 1/4208;
H02M 1/4216; H02M 1/4225; H02M
1/4233; H02M 1/4241; H02M 1/425;
H02M 1/4258; H02M 2001/4275; H02M
2001/4283; H02M 2001/4291; H02J 3/46;
H02J 3/38; H02J 3/36; H02J 3/01; H02J
3/1878; H02H 7/261; H02H 7/268; H02H
7/055; H01F 29/00; H01F 29/02; H01F
29/025; H01F 29/04; G05F 1/10; G05F
1/12; G05F 1/14; G05F 1/147; G05F
1/153; G05F 1/16; G05F 1/20; G05F
1/22; G05F 1/24; G05F 1/247; G05F
1/253; G05F 1/26; G05F 1/30; H01H
9/0005

See application file for complete search history.

(56) References Cited

U.S. PATENT DOCUMENTS

| | | | | |
|---|---|---|---|---|
| 10,476,369 B2* | 11/2019 | Chen | .................... | H03K 17/166 |
| 11,764,692 B2* | 9/2023 | Atteia | .................... | H02M 1/44 |
| | | | | 363/17 |
| 11,831,233 B2* | 11/2023 | Gazit | .................. | H02M 7/5395 |
| 2010/0201338 A1* | 8/2010 | Haj-Maharsi | ....... | H02M 1/4233 |
| | | | | 323/305 |
| 2012/0057178 A1* | 3/2012 | Toscano | ............ | H04N 1/00209 |
| | | | | 358/1.13 |
| 2013/0207471 A1* | 8/2013 | Divan | ....................... | H02J 3/36 |
| | | | | 307/43 |
| 2016/0099653 A1* | 4/2016 | Divan | ....................... | H02J 3/06 |
| | | | | 363/35 |
| 2020/0395860 A1* | 12/2020 | Lin | ................... | H02M 3/33584 |

FOREIGN PATENT DOCUMENTS

| | | |
|---|---|---|
| EP | 2698911 A1 | 2/2014 |
| EP | 3518366 A2 | 7/2019 |
| EP | 3540750 A1 | 9/2019 |
| ES | 2219145 A1 | 11/2004 |
| JP | S60194824 A | 10/1985 |
| JP | S61281312 A | 12/1986 |
| JP | H11204290 A | 7/1999 |
| JP | 2004023883 A | 1/2004 |
| JP | 2012147528 A | 8/2012 |
| WO | 1999/41828 A1 | 8/1999 |
| WO | WO-2016177376 A1 * | 11/2016 ............... F03D 9/25 |

OTHER PUBLICATIONS

International Search Report and Written Opinion of the International Searching Authority, PCT/EP2021/077275, mailed Jan. 17, 2022, 13 pages.
International Preliminary Report on Patentability, PCT/EP2021/077275, mailed Dec. 19, 2022, 20 pages.
Extended European Search Report, EP20200063.4, mailed Jun. 1, 2021, 15 pages.
Mario Schweizer et al.: "Design and Implementation of a Highly Efficient Three-Level T-Type Converter for Low-Voltage Applications", IEEE Transactions On Power Electronics, vol. 28, No. 2, Feb. 1, 2013 (Feb. 1, 2013), pp. 899-907, XP055537943, USA, ISSN: 0885-8993.
Van Schalkwyk, C. et al.: "An AC-to-AC Converter Based Voltage Regulator"; IEEE Africon 2002; IEEE, vol. 2, Oct. 2, 2002, pp. 719-722, XP010622901, DOI: 10 . . . 1109/AFRCON.2002.1160002; ISBN 978-0-7803-7570-3.
Office Action, European Patent Application No. 20200063.4, mailed May 14, 2024, 10 pages.
Decision to Grant, Japanese Patent Application No. 2023-520512, mailed May 28, 2024, 5 pages.
Zhang, L., et al., "Evaluation of Different Si/SiC Hybrid Three-Level Active NPC Inverters for High Power Density," IEEE Transactions on Power Electronics, vol. 35, No. 8, Aug. 2020, pp. 8224-8236, 13 pages.

* cited by examiner

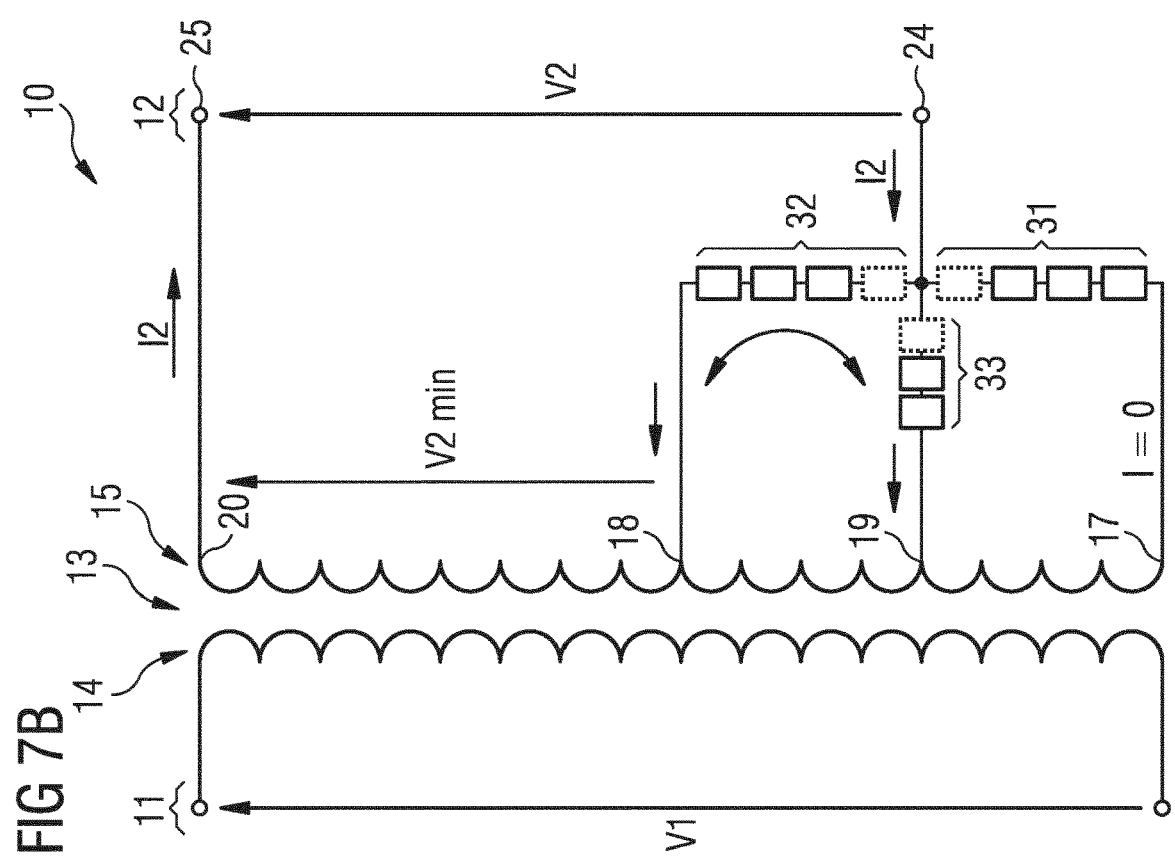
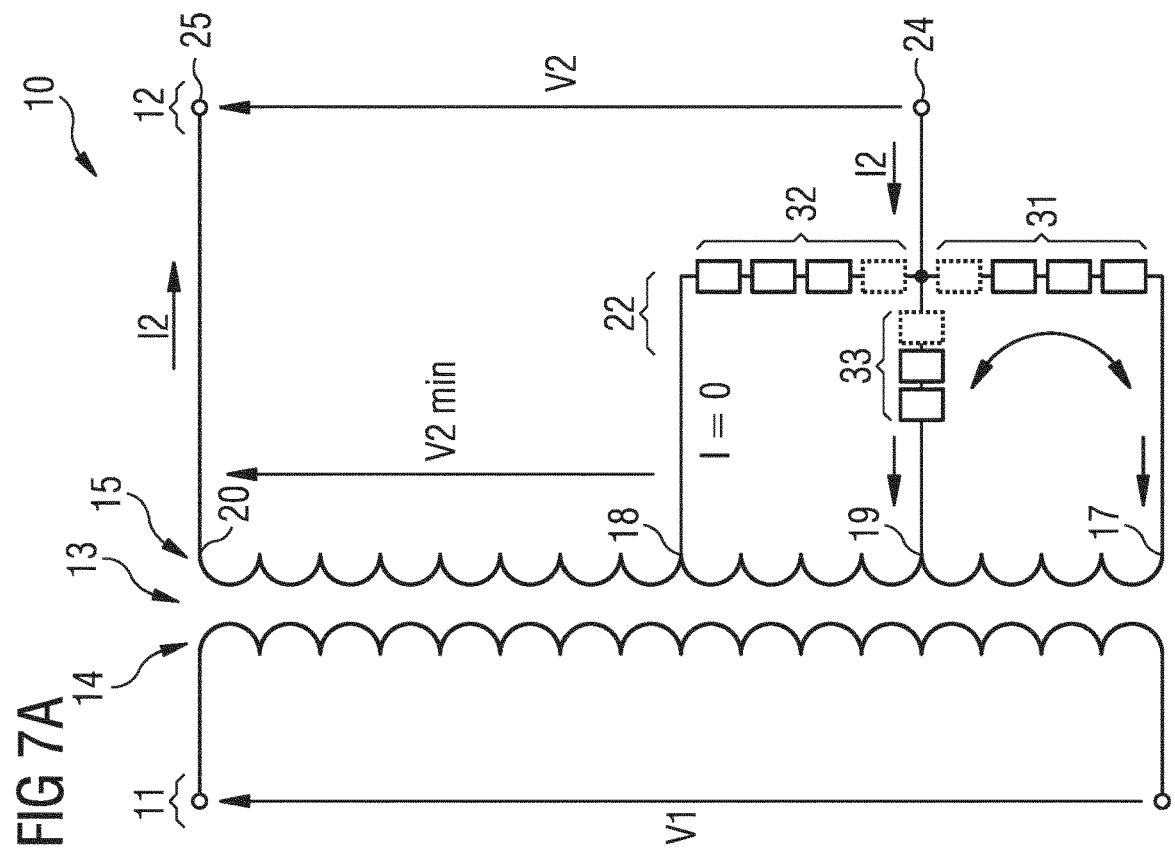

FIG 8B (1) switching frequency $$f_{SW} \Rightarrow T_{SW} = \frac{1}{f_{SW}}$$

(2) operation mode if $\Rightarrow V_2^n < V_2 < V_2^{max} \Rightarrow$ mode 1 if $\Rightarrow V_2^{min} < V_2 < V_2^n \Rightarrow$ mode 2 if $\Rightarrow V_2 = V_2^n \Rightarrow$ mode 3

(3) duty cicle ($\delta$)

$$V_{ref} \Rightarrow \delta = \frac{t_{on}}{T_{SW}}$$

(4) voltage control mode 1 $\Rightarrow V_2 = V_{2a} + V_{2b} + \delta \cdot V_{2c}$ mode 2 $\Rightarrow V_2 = V_{2a} + \delta \cdot V_{2b}$ mode 3 $\Rightarrow V_2 = V_{2a} + V_{2b} = V_2^n$

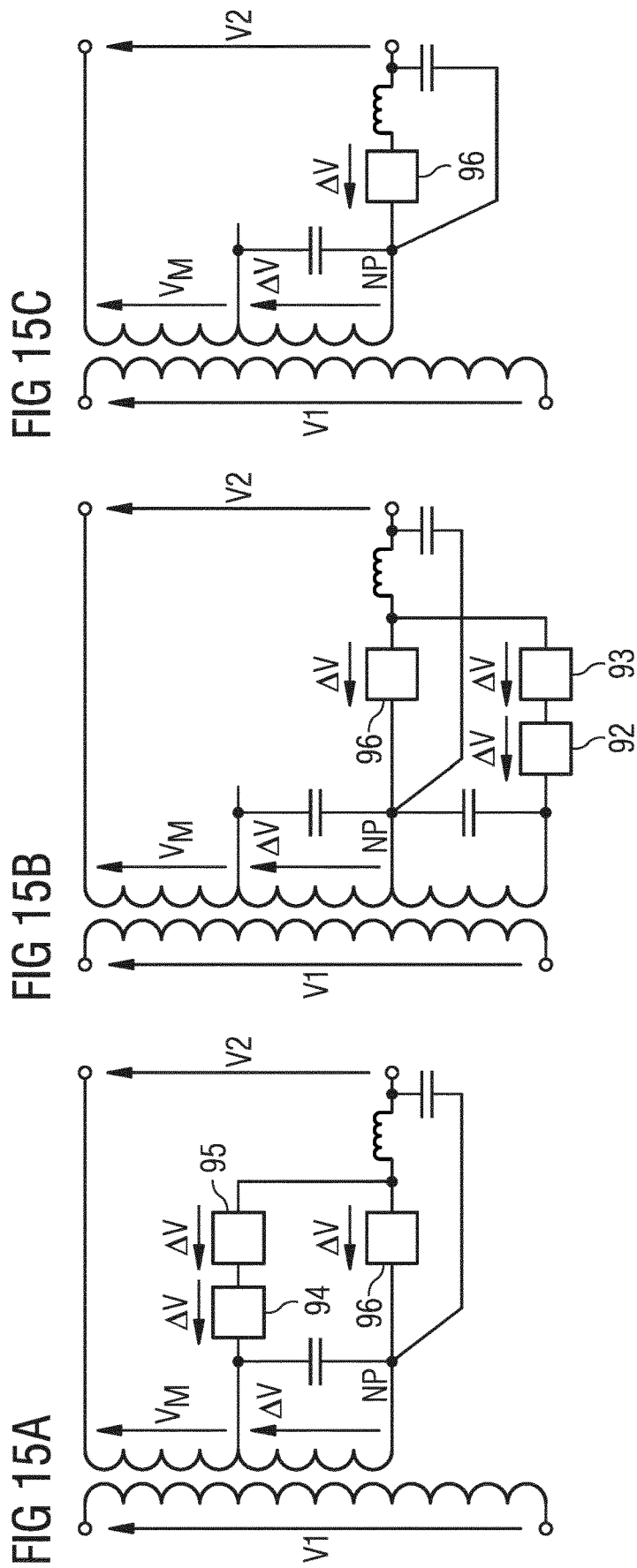

TRANSFORMER ARRANGEMENT AND METHOD FOR VOLTAGE CONVERSION INCLUDING A TRANSFORMER AND A CONVERTER COUPLING

CROSS REFERENCE TO RELATED APPLICATIONS

This application is a 35 U.S.C. § 371 national stage application of PCT International Application No. PCT/EP2021/077275 filed on Oct. 4, 2021, which in turn claims foreign priority to European Patent Application No. 20200063.4, filed on Oct. 5, 2020, the disclosures and content of which are incorporated by reference herein in their entirety.

BACKGROUND

The disclosure is related to a transformer arrangement and a method for voltage conversion.

A transformer arrangement performs An AC to AC conversion. Since the number of windings on a first side and on a second side of the transformer are constant, also the conversion rate is constant. In order to vary the conversion rate, an on-load tap changer, abbreviated OLTC, can be used. However, an OLTC may result in high manufacturing costs and may only be used to realize distinct values of the conversion rate.

Document US 2013/0207471 A1 describes imputed DC link cell-based power converters. A power converter comprises a transformer having first windings and second windings with four taps. Three taps are coupled by imputed DC link cells and an output filter inductor to an output of the power converter.

Document US 2016/0099653 A1 describes a power flow controller with a fractionally rated back-to-back converter. A transformer has second windings with four taps. Two of the four taps are coupled by a converter to an output of the arrangement.

It is an object to provide a transformer arrangement and a method for voltage conversion with a high flexibility of the conversion rate.

The object is achieved by the subject matter of the independent claims. Further developments are described in the dependent claims.

SUMMARY

There is provided a transformer arrangement which comprises a first and a second arrangement side, a transformer, a converter and a first and a second filter circuit. The transformer comprises first windings coupled to the first arrangement side and second windings having a first, a second, a third and a fourth tap. The converter couples the first, second and third tap to the second arrangement side. The first filter circuit couples the first tap to the third tap. The second filter circuit couples the third tap to the second tap.

Advantageously, the converter receives three voltages on its input side and is able to generate a second voltage using these three voltages. A first voltage is tapped at the first arrangement side. The second voltage is tapped at the second arrangement side. The second voltage may be an output voltage. The second voltage can have several different values. A conversion rate of the transformer arrangement can be controlled.

The first arrangement side may be a high-voltage side and the second arrangement side may be a low-voltage side; the first voltage is higher than the second voltage. Alternatively, the first arrangement side may be the low-voltage side and the second arrangement side may be the high-voltage side; the first voltage is lower than the second voltage.

The first arrangement side may be a source side and the second arrangement side may be a load side. Thus, the first arrangement side may be coupled to a source such as a grid and the second arrangement side may be coupled to a load such as a motor of further grid.

Alternatively, the first arrangement side may be a load side and the second arrangement side may be a source side. Thus, the first arrangement side may be coupled to a load and the second arrangement side may be coupled to a source.

In a development of the transformer arrangement, the converter comprises a first arm comprising a first number of cells and a first terminal connected to the first tap, a second arm comprising a second number of cells and a first terminal connected to the second tap and a third arm comprising a third number of cells and a first terminal connected to the third tap. Advantageously, the first, second and third tap are each connected to a separate arm. By controlling the three arms the generation of the second voltage as a function of the voltages tapped at the tree taps can be tuned.

In a development, the transformer arrangement comprises a filter circuitry. The filter circuitry may be implemented as a low-pass filter. The filter circuitry couples the converter to the second arrangement side. Advantageously, the filter circuitry may achieve a smoothing of the second voltage.

In the development of the transformer arrangement, a second terminal of the first arm, a second terminal of the second arm and a second terminal of the third arm are coupled via the filter circuitry to a first terminal of the second arrangement side. Thus, the first, second and third arm are connected to one terminal of the filter circuitry and another terminal of the filter circuitry is coupled to the first terminal of the second arrangement side.

In a development of the transformer arrangement, the filter circuitry includes a capacitive element connected to the third tap. Moreover, the filter circuitry comprises an inductive element.

In a development of the transformer arrangement, the fourth tap of the second windings is coupled to the second arrangement side. The fourth tap is connected or coupled to a second terminal of the second arrangement side.

In a development of the transformer arrangement, the first arm comprises a first LF part and a first HF part. The second arm comprises a second LF part and a second HF part. The third arm comprises a third HF part. The converter comprises a first and a second internal filter. The first internal filter couples a node between the first LF part and the first HF part to a neutral point. The second internal filter couples a node between the second LF part and the second HF part to the neutral point. In an example, the third arm may be free from a LF part.

In a development of the transformer arrangement, the first, the second and the third HF part include a cell of a first type. The first and the second LF part include a cell of a second type. LF is an abbreviation for low frequency or low switching frequency and HF is an abbreviation for high frequency or high switching frequency. The cell of the first type is configured for operation at higher frequencies as the cell of the second type. The cell of the first type operates at high switching frequency. The cell of the second type operates at low switching frequency.

In a development of the transformer arrangement, the converter comprises a fourth arm comprising a fourth number of cells and a first terminal connected to the third tap. A second terminal of the third arm is connected to a node of the first arm. A second terminal of the fourth arm is connected to a node of the second arm. A second terminal of the first arm and a second terminal of the second arm are coupled to a first terminal of the second arrangement side. Advantageously, by using the third and the fourth arm the second voltage can be generated with high flexibility.

In a development of the transformer arrangement, the first arm includes a first internal filter. The second arm includes a second internal filter. Advantageously, the second voltage tapped at the first terminal of the second arrangement side is smoothed by the first and the second internal filter.

In a development of the transformer arrangement, the node of the first arm is located between a first LF part of the first arm and a first HF part of the first arm. The node of the second arm is arranged between a second LF part of the second arm and a second HF part of the second arm.

In a development of the transformer arrangement, the third number of cells is less than the first number of cells and is less than the second number of cells. Advantageously, a voltage across the third arm is less than a voltage across the first arm and a voltage across the second arm. The converter can be realized using a smaller number of cells for the third arm in comparison to the first and second arm. Advantageously, the third number of cells being less than the first number of cells and less than the second number of cells results in lower losses and less costs in comparison to a converter with three arms having the same number of cells.

In a development of the transformer arrangement, the first number of cells is equal to the second number of cells. Advantageously, a maximum value of a voltage across the first arm and a maximum value of a voltage across the second arm are equal.

The first number of cells is e.g., larger than 1. The second number of cells is e.g. larger than 1. The third number of cells is e.g., larger than 1. The fourth number of cells is e.g., larger than 1.

In a development of the transformer arrangement, a cell comprises a device of a group comprising a metal-oxide-semiconductor field-effect transistor (abbreviated MOSFET), an insulated-gate bipolar transistor (IGBT), a reverse-conducting insulated-gate bipolar transistor (RC-IGBT), a thyristor and a bi-mode insulated gate transistor (BIGT). Advantageously, the devices of this group allow to set the cell in a conducting and a non-conducting state.

In a development of the transformer arrangement, the thyristor may be one of a phase-controlled thyristor (PCT), a bidirectional-controlled thyristor (BCT) and an integrated gate-commutated thyristor (IGCT).

In a development of the transformer arrangement, the first number of cells of the first arm includes at least a cell of a first type and a cell of a second type. The second number of cells of the second arm includes at least a cell of a first type and a cell of a second type. The cell of the first type is realized as a high-frequency cell and the cell of the second type is realized a low-frequency cell. The cell of the first type and the cell of the second type are realized in a different manner, i.e., they include different devices, e.g., as listed above. The cell of a first type is configured for operation at higher frequencies as the cell of a second type. In an example, low switching frequencies or an operating range of a low-frequency cell may be from 20 Hz to 1 kHz or from 50 Hz to 600 Hz or from 60 Hz to 500 Hz. In an example, high switching frequencies or an operating range of a high-frequency cell may be from 0.4 kHz to 200 kHz or from 0.6 to 100 kHz. These are only examples of ranges. There may be an overlap between a range of the high-frequency cell and a range of the low-frequency cell.

In a development of the transformer arrangement, a cell of a first type (also named HF cell) includes e.g., wide-bandgap devices (abbreviated WBG devices) and/or devices optimized for low switching losses. The devices can be either transistors or thyristors.

In a development of the transformer arrangement, a cell of a second type (also named LF cell) includes devices optimized for low conduction losses. The devices can be either transistors or thyristors.

In a development, the transformer arrangement comprises a by-pass switch coupling the first terminal of the second arrangement side to one of a group comprising the first, the second and the third tap. The by-pass switch can be used for short circuit protection. The by-pass switch may include a thyristor or another switch.

In a development, the transformer arrangement comprises a box in which the converter is arranged and a tank in which the transformer and the box are arranged. Advantageously, one cooling system is used for the converter and for the transformer.

In a development, the transformer arrangement comprises a box in which the converter is arranged, a tank in which the transformer is arranged and bushings that couple at least the first, the second and the third tap to the converter. Advantageously, the tank is separated from the box. The box is not inside in the tank. Thus, a maintenance or replacement of the converter can be performed separately from a maintenance or replacement of the transformer.

There is provided a method for voltage conversion which comprises:
  providing a first voltage to first windings of a transformer,
  generating voltages at a first to a fourth tap of second windings of the transformer,
  providing a second voltage by a converter coupled to the first, second and third tap,
  filtering a voltage between the first tap and the third tap by a first filter circuit, and
  filtering a voltage between the third tap and the second tap by a second filter circuit.

Advantageously, the voltage between the first tap and the third tap is smoothed by the first filter circuit. Correspondingly, the voltage between the third tap and the second tap is smoothed by the second filter circuit. By controlling the converter, the second voltage can be set on a predetermined value. The first and the second voltage are AC voltages.

The transformer arrangement is particularly suitable for the method for voltage conversion. Features described in connection with the transformer arrangement can therefore be used for the method and vice versa.

In a development, the transformer arrangement realizes a power electronic AC-AC converter as OLTC for transformer voltage regulation. Power electronic (sometimes called power electronics) is abbreviated PE. The converter can be implemented as power electronic converter, abbreviated PE converter. The power electronic AC-AC converter topology shows benefits in terms of on-load voltage regulation to replace the traditional electromechanical OLTC of the transformer to reduce the transformer manufacturing cost and to improve the functionalities. The transformer arrangement implements a regulation of the power transformer voltage and/or the power flow through the transformer, e.g., by a stepped or step-less voltage control.

The following description of figures of examples or embodiments may further illustrate and explain aspects of the transformer arrangement and the method for voltage conversion. Arrangements, devices, circuits and cells with the same structure and the same effect, respectively, appear with equivalent reference symbols. In so far as arrangements, devices, circuits and cells correspond to one another in terms of their function in different figures, the description thereof is not repeated for each of the following figures.

BRIEF DESCRIPTION OF DRAWINGS

FIGS. 6, 7A to 7C, 8A, 8B, 9, 10, 11A and 11B show example embodiments of transformer arrangements;

FIGS. 15A to 15C, 16A to 16C, 17A and 17B show example modes of a transformer arrangement.

DETAILED DESCRIPTION

Figure 1:
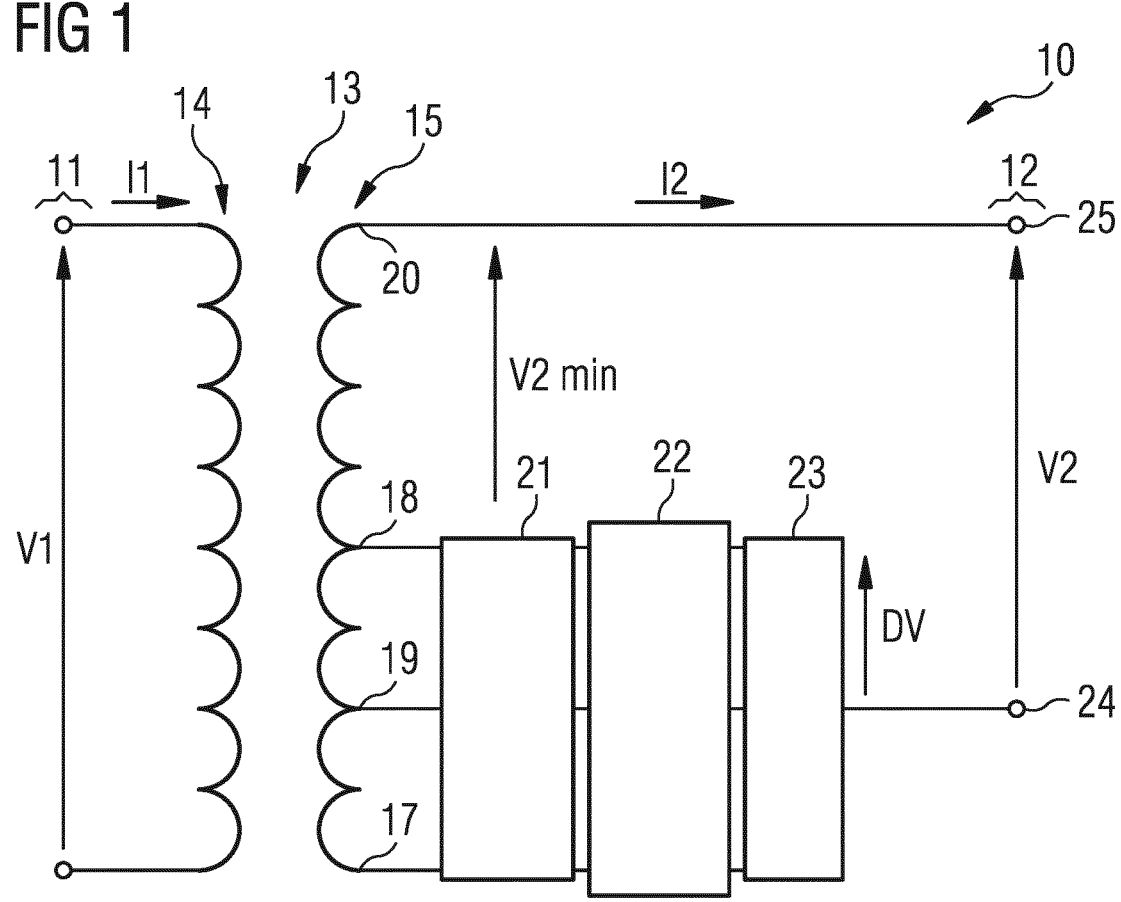
FIGS. 1, 2A and 2B show example embodiments of a transformer arrangement.

FIG. 1 shows an example embodiment of a transformer arrangement 10. The transformer arrangement 10 comprises a first and a second arrangement side 11, 12 and a transformer 13. The transformer 13 includes first windings 14 and second windings 15. The second windings 15 have a first to a fourth tap 17 to 20. The transformer arrangement 10 comprises a filter arrangement 21 that is connected to the first to the third tap 17 to 18. Additionally, the transformer arrangement 10 comprises a converter 22. The converter 22 may be implemented as a power electronic converter. The converter 22 is coupled via the filter arrangement 21 to the first, second and third tap 17 to 18. The transformer arrangement 10 comprises a filter circuitry 23 coupled to the converter 22 and to the second arrangement side 12. The second arrangement side includes a first and a second terminal 24, 25. The first terminal 24 of the second arrangement side 12 is coupled via the filter circuitry 23, the converter 22 and the filter arrangement 21 to the first, second and third tap 17 to 19. The second terminal 25 of the second arrangement side is connected to the fourth tap 20. The filter circuitry 23 can also be named output filter. The filter arrangement 21 may include an electromagnetic interference filter, abbreviated EMI filter. The filter arrangement 21 may be called input filter.

At the first arrangement side 11, a first voltage V1 is tapped. At the second arrangement side 12, a second voltage V2 is tapped. The second voltage V2 is tapped between the first and the second terminal 24, 25. The first voltage V1 may be realized as a high voltage and the second voltage V2 may be realized as a low voltage. Thus, V1>V2. The second voltage V2 may be provided to a load. Between the second tap 18 and the fourth tap 20 a minimum voltage V2min is tapped. A difference voltage DV is tapped between the first terminal 24 of the second arrangement side 12 and the second tap 18. A first current I1 flows through the first windings 14. A second current I2 flows through the second windings 15, especially through the second terminal 25. The second current I2 may also be called load current.

In FIG. 1, the transformer arrangement 10 includes input and output filters 21, 23. The converter 22 implements an on-load PE tap changer. Depending on the rated power and design requirements of the transformer arrangement 10, which includes requirements e.g., for maximum harmonic content, input and output filters 21, 23 are provided. In each tap-changer case, the filters 21, 23 are designed by using reactors, capacitors and resistors. An input capacitor 21 and output reactor can be enough in many tap-changer cases.

Figure 2A:
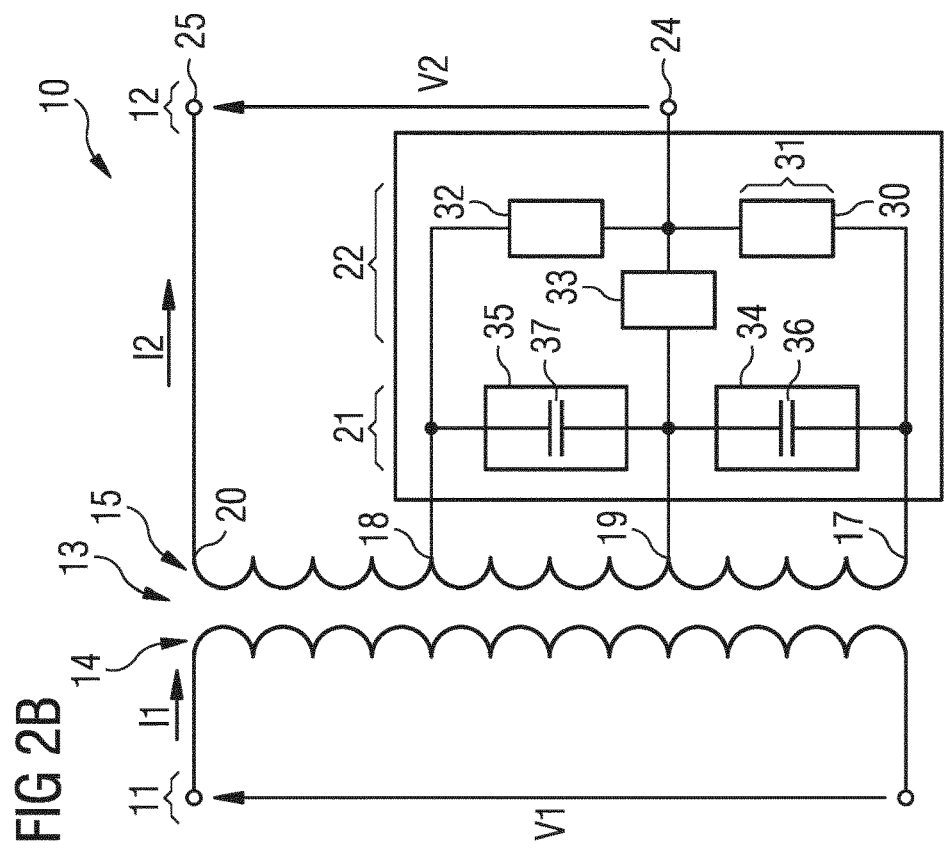
Figure 2B:
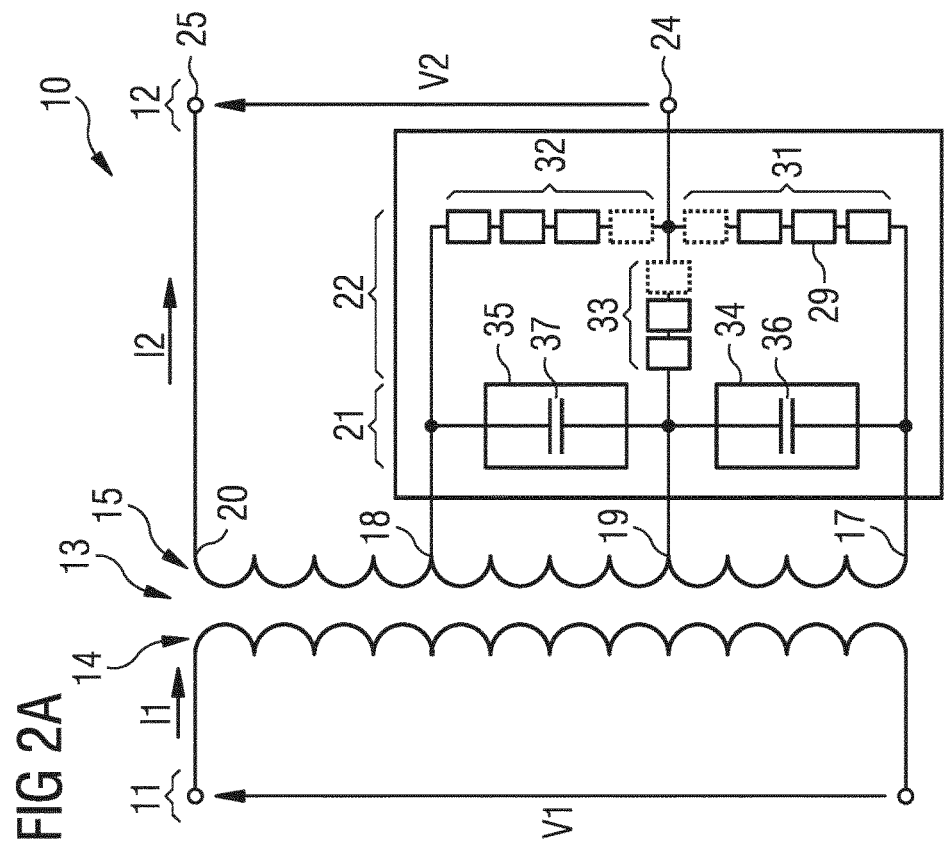

FIGS. 2A and 2B show example embodiments of a transformer arrangement 10 which are further developments of the embodiment shown in FIG. 1. The converter 22 comprises a first, a second and a third arm 31, 32, 33. The first arm 31 has a first terminal connected to the first tap 17. A second terminal of the first arm 31 is coupled to the first terminal 24 of the second arrangement side 12. The second arm 32 has a first terminal connected to the second tap 18. A second terminal of the second arm 32 is coupled to the first terminal 24 of the second arrangement side 12. Correspondingly, the third arm 33 has a first terminal connected to the third tap 19. A second terminal of the third arm 33 is coupled to the first terminal 24 of the second arrangement side 12. The converter 22 can also be named power electronic on-load tap changer AC to AC converter (abbreviated PE OLTC AC-AC converter).

As shown in FIG. 2A, the first arm 31 includes a first number N1 of cells 29, the second arm 32 includes a second number N2 of cells and the third arm 33 comprises a third number N3 of cells. The first number N1 may be equal to the second number N2. The third number N3 may be less than the first number N1 and less than the second number N2.

The transformer arrangement 10 comprises a first filter circuit 34 and a second filter circuit 35. The first and second filter circuit 34, 35 form the filter arrangement 21. The first and the second filter circuit 34, 35 may be called input filters. The first and the second filter circuit 34, 35 each comprises a capacitor 36, 37.

The second voltage V2 may be named output voltage, transformer output voltage, load voltage or transformer LV output voltage. Continuous and fast regulation of the second voltage V2 can be implemented by the transformer arrangement 10 shown in FIGS. 2A and 2B. The converter 22 allows, within the design margins, to eliminate the traditional step-by-step electromechanical OLTC and to reduce the transformer production cost by eliminating the regulation winding. By removing the regulation winding, the transformer design can be improved to save material and labor cost. The topology allows to simplify the requirements on the transformer design and eliminate the electromechanical OLTC to provide at least one of: Fast continuous on-load voltage regulation; mitigation of voltage flickers; phase angle control of the second voltage V2 (the phase angle can be changed within a certain range); and a modified converter cell can work as a circuit breaker.

The transformer arrangement 10 realizing a PE OLTC AC/AC converter topology is shown in FIGS. 2A and 2B. FIG. 2A illustrates a basic scheme (with cells 29) and FIG. 2B a matrix scheme (with cells 29). In FIG. 2B, the first arm 31 includes a matrix 30 (which is explained in FIGS. 3C and 3D). Correspondingly, the second and the third arm 32, 33 each comprises a matrix.

The converter design will depend on at least one of:
Voltage and current requirements;
Device voltage class and device current class;
Design factors and margins; and/or
Required reliability (redundancy).

FIGS. 3A to 3D show example embodiments of a cell 29 and of a matrix 30 which can be used in the first to the third arm 31 to 33.

Figure 3A:
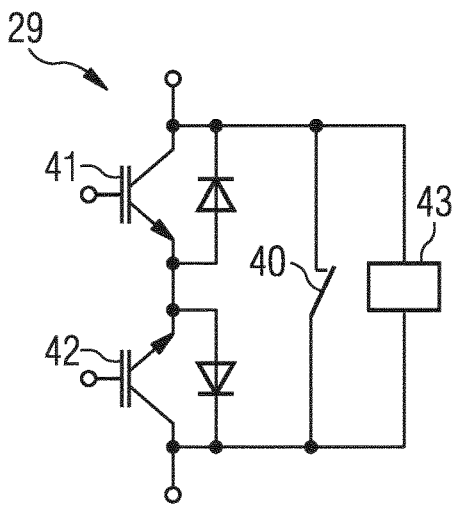
FIGS. 3A to 3D show example embodiments of a cell and FIGS. 3E and 3F show exemplary embodiments of a filter circuit.

In FIG. 3A, the cell 29 includes a first and a second device 41, 42 and a switch 40 (which may be named by-pass switch). The first and the second device 41, 42 are connected in series. The first and the second device 41, 42 form an anti-series device connection. The first and the second device 41, 42 can be realized as insulated-gate bipolar transistor (abbreviated IGBT). Alternatively, the first and the second device 41, 42 are fabricated as metal-oxide-semiconductor field-effect transistor (abbreviated MOSFET). The cell 29 comprises a snubber filter 43. The snubber filter 43 includes a capacitor. Alternatively, the cell 29 is realized without a snubber filter.

Figure 3D:
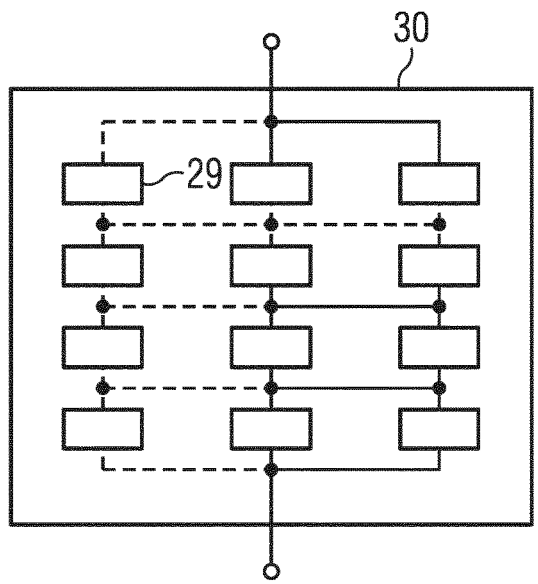
Figure 3B:
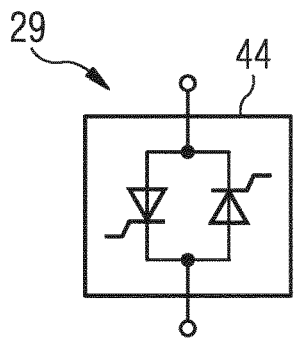

In FIG. 3B, the cell 29 includes a device 44. The device 44 is a semiconductor device with bipolar-voltage capability and unidirectional-current capability based on Si or wide-band gap (e.g., SiC) semiconductors. The device 44 is e.g., implemented as a phase-controlled thyristor (abbreviated PCT). Alternatively, the cell 29 shown in FIG. 3B includes a first and a second device that are connected in parallel, for example in an anti-parallel circuit. Thus, the cell 29 is realized by two anti-parallel devices.

Figure 3E:
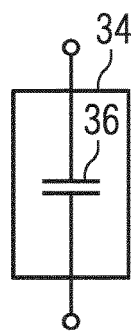
Figure 3C:
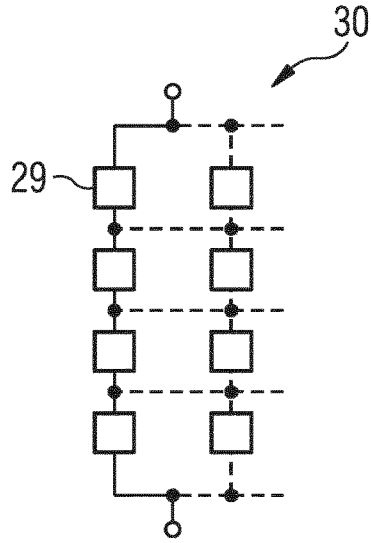

In FIGS. 3C and 3D, the matrix 30 includes cells 29 which are connected in serious and/or parallel. The cells 29 can be realized such as described above or below. In general, different semiconductor device technologies can be used to realize the cell 29 and/or the matrix 30: Si and SiC semiconductor materials and an insulated-gate bipolar transistor (abbreviated IGBT), a metal-oxide-semiconductor field-effect transistor (abbreviated MOSFET) and an integrated gate-commutated thyristor (abbreviated IGCT) semiconductor types. The matrix 30 e.g., includes at least two cells 29 that are connected in parallel.

Figure 4:
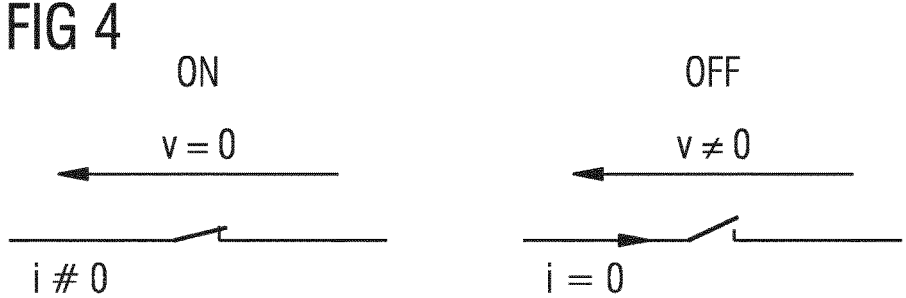
FIGS. 4 and 5A to 5D show examples of modes of a cell.
Figure 5A:
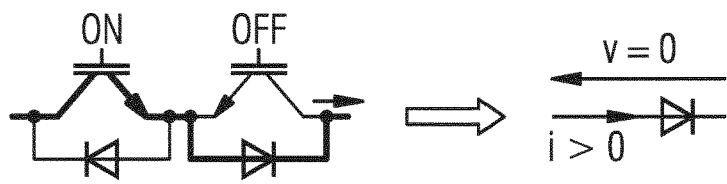
Figure 5B:
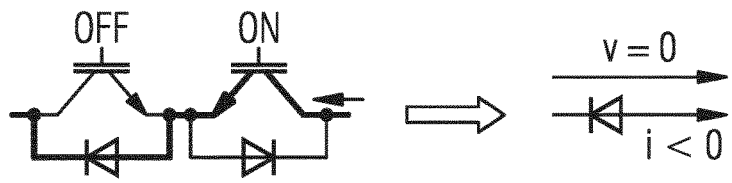
Figure 5C:
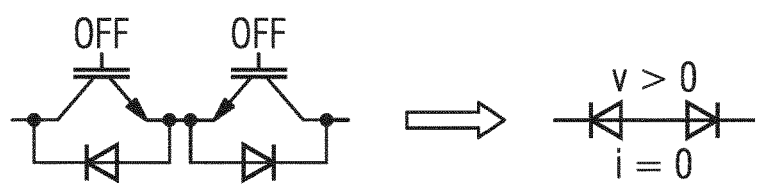
Figure 5D:
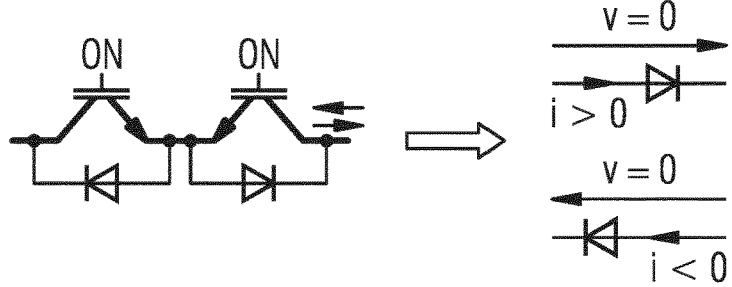

Each arm 31 to 33 includes an anti-series connection of power devices (IGBT and/or MOSFET) as shown e.g., in FIG. 3A to 3D, to form switches that can operate in ON-OFF conditions in both current directions and both blocking-voltage polarities, as displayed in FIG. 4.

In FIG. 2B and FIGS. 3C and 3D, the same concept is elucidated using a series and/or parallel connection of the switches or cells 29 in order to design the matrix 30 in order to increase the current and/or voltage converter requirements and/or to improve the system reliability. The matrix 30 also operates as ON-OFF switches in both current directions and both blocking-voltage polarities, as shown in FIG. 4.

In FIG. 3C, the matrix 30 includes a matrix arrangement of cells 30 having anti-series devices. The first, second or third arm 31 to 33 is a series/parallel combination of switches in the form of a matrix arrangement.

A cell 29 may be realized as a cell 29' of a first type or a cell 29" of a second type. The cell 29' of the first type may also be named high-frequency cell. The cell 29" of the second type may be named low-frequency cell.

The cell 29 is implemented as a 4-quadrant switch, abbreviated 4QS.

The cell 29" of the second type operates at low switching frequency and can be implemented in the following ways:
By employing semiconductor devices with unipolar-voltage capability and bidirectional-current capability based on Si or wide-band gap (e.g., SiC) semiconductors. Examples of such devices are IGBTs and MOSFETs, as shown in FIG. 3A.
By employing semiconductor devices with bipolar-voltage capability and unidirectional-current capability based on Si or wide-band gap (e.g., SiC) semiconductors. A phase-controlled thyristor (PCT) is an example of such device.
By employing semiconductor devices with bipolar-voltage and bidirectional-current capabilities based on Si or wide-band gap (e.g., SiC) semiconductors. A bidirectional-controlled thyristor (abbreviated BCT) is an example of such a device, as shown in FIG. 3B.

The cells 29" of the second type can be interconnected in the following ways: A series connection of cells 29" as shown in FIG. 2A or a matrix 30 of such cells 29" (connected in series, parallel or both), as illustrated in FIGS. 3C and 3D.

The cell 29' of the first type operates at high switching frequency (abbreviated HF) and can be implemented by semiconductor devices with unipolar-voltage capability and bidirectional-current capability based on Si or wide-band gap (e.g., SiC) semiconductors. Examples of such devices are IGBTs and MOSFETs, as shown in FIG. 3A. The cells 29' of the first type can be interconnected in the following ways: A series connection of cells 29' as shown in FIG. 2A or a matrix 30 of such cells 29' (connected in series, parallel or both), as illustrated in FIGS. 3C and 3D.

Figure 3F:
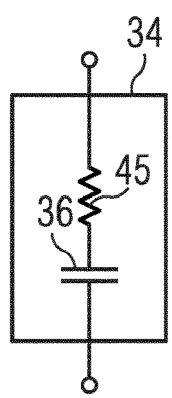

FIGS. 3E and 3F show example embodiments of a first filter circuit 34 which is a further development of the embodiment shown in FIGS. 2A and 2B. The second filter circuit 35, the snubber filter 43, a capacitive element 91, a first and a second internal filter 97, 98 and an internal filter 102 (shown below) may be realized such as the first filter circuit 34. Capacitive filters similar to the first filter circuit 34 are indicated by the letters Fc in the drawings.

The first filter circuit 34 is a capacitive filter that can be implemented e.g. in the following ways:
Single capacitor 36, as shown in FIG. 3E.
Parallel-connected capacitors.
Series-connected capacitors.
Matrix of series-parallel-connected capacitors.

As shown in FIG. 3F, the first filter circuit 34 is e.g., a resistive/capacitive filter. The first filter circuit 34 comprises a resistor 45. The resistor 45 is connected in series to the capacitor 36. All the above may be combined with the resistor 45 (or a matrix of resistors) connected in series either to each single capacitor or to any combination of capacitors (series, parallel, or both). The introduced resistor(s) are useful for damping resonances between the capacitor(s) and inductive elements connected to the first filter circuit 34 or to other capacitive filters.

FIG. 4 show examples of modes of a cell 29 or a matrix 30 described above, namely an equivalent ON-OFF switch of the individual anti-series device or cell arrangement.

FIGS. 5A to 5D show examples of modes of a cell 29, described above. The normal operation modes of the anti-series switches or cells 29 are shown in FIGS. 5A, 5B, 5C and 5D. Switches in the ON state and the current path are highlighted with bold lines. Switches in the OFF state and connection lines without current or with a small current are shown with normal lines.

Figure 6:
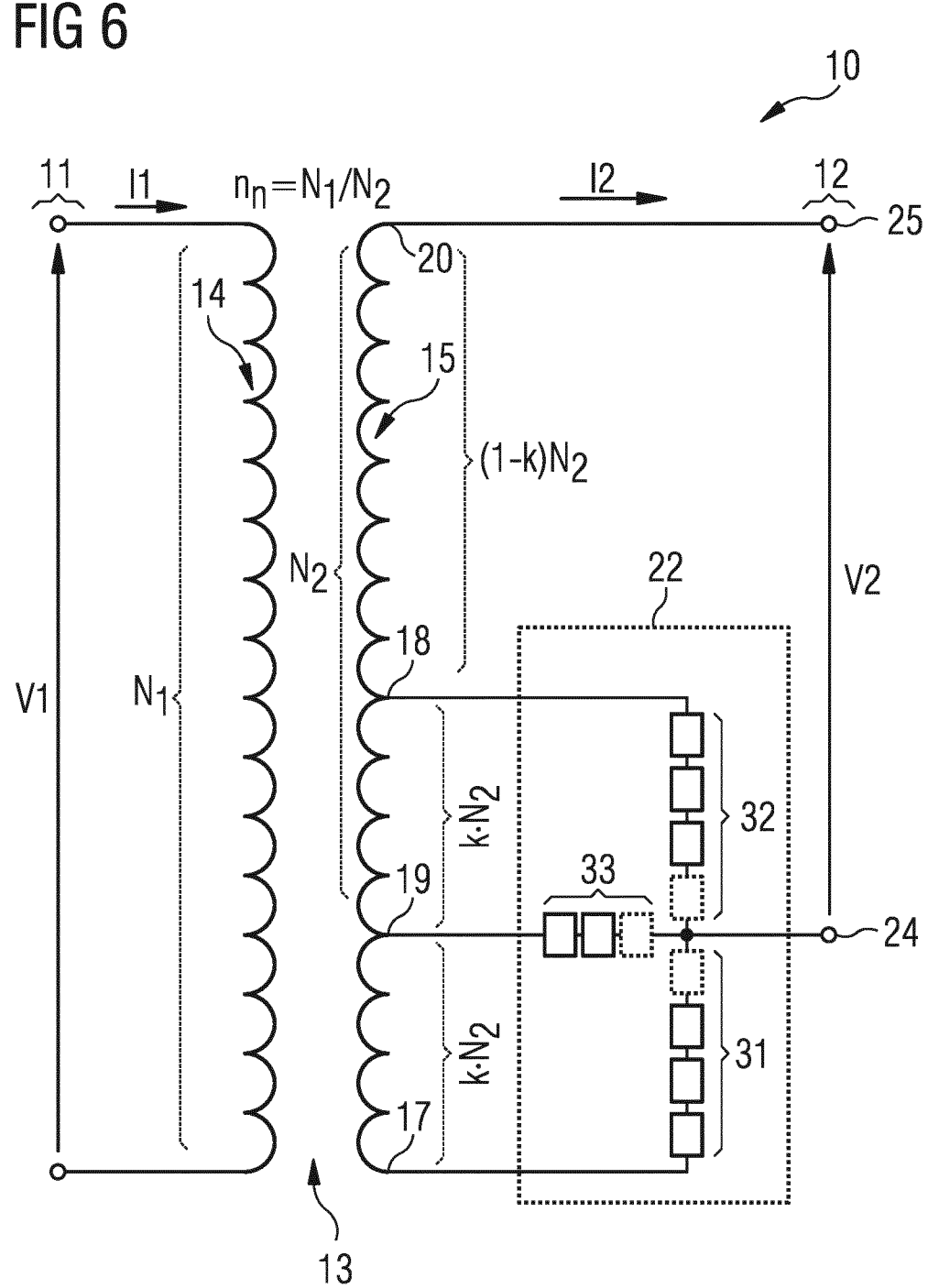

FIG. 6 shows an example embodiment of a transformer arrangement 10 which is a further development of the embodiments shown above. The third arm 33 in both cases can be dimensioned for transformer nominal current and for a lower voltage than the other two arms, the first and the second arm 31, 32. During normal operating conditions the losses will be less.

Figure 7C:
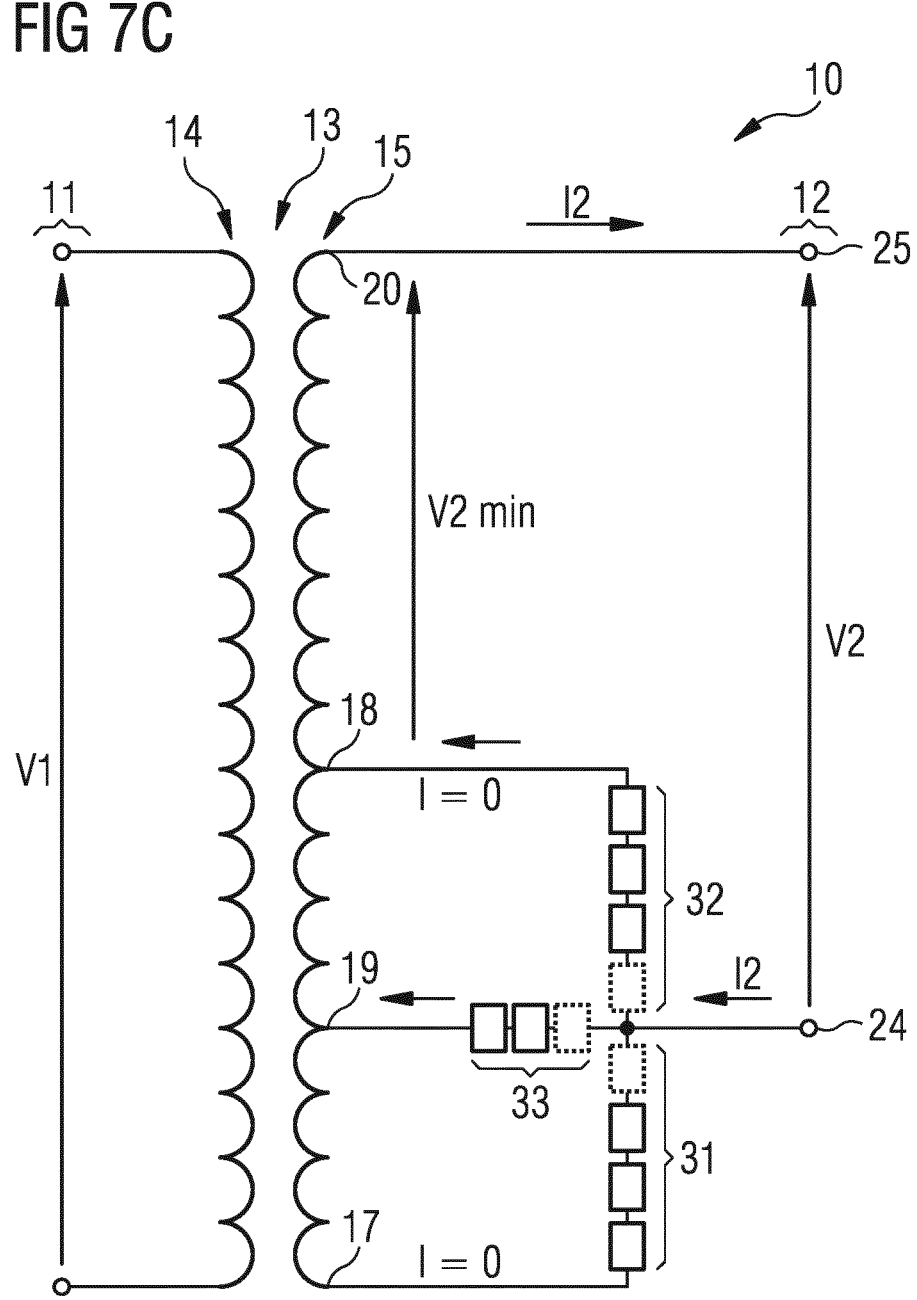

As shown in FIG. 6, the second voltage V2 can be regulated within a certain voltage range depending on the design and the three different normal operation modes as described in FIGS. 7A to 7C. Depending on the desired value of the second voltage V2, one or two arms are conducting. LV is the abbreviation for low voltage. HV is the abbreviation for high voltage.

In FIG. 6, a single-phase PE OLTC AC-AC converter 22 at LV side is shown. Alternatively, the converter 22 is connected to the HV side. The input capacitors have been omitted for clarity. Thus, the filter arrangement 21, the first and the second filter circuit 34, 35 and the filter circuitry 23 have been omitted for clarity in FIGS. 6, 7A to 7C, 8A, 8B, 9, 10, 11A, 11B, 12, 13A and 13B.

FIGS. 7A to 7C show modes of an example embodiment of a transformer arrangement 10 shown above. In FIGS. 7A to 7C, normal operation modes of the proposed on-load PE tap changer are illustrated.

In FIG. 7A, mode 1: The first and the third arm 31, 33 are active and switching alternately:

V2nom<V2<V2 max

In FIG. 7B, mode 2: The second and the third arm 32, 33 are active and switching alternately:

V2 min<V2<V2nom

In FIG. 7C, mode 3: The third arm 33 is active.

V2=V2nom

V2 is the second voltage. V2min is a minimum value of the second voltage and is tapped at the second tap 18. V2max is a maximum value of the second voltage and is tapped at the first tap 17. V2nom is a nominal value of the second voltage and is tapped at the third tap 19.

Figure 8A:
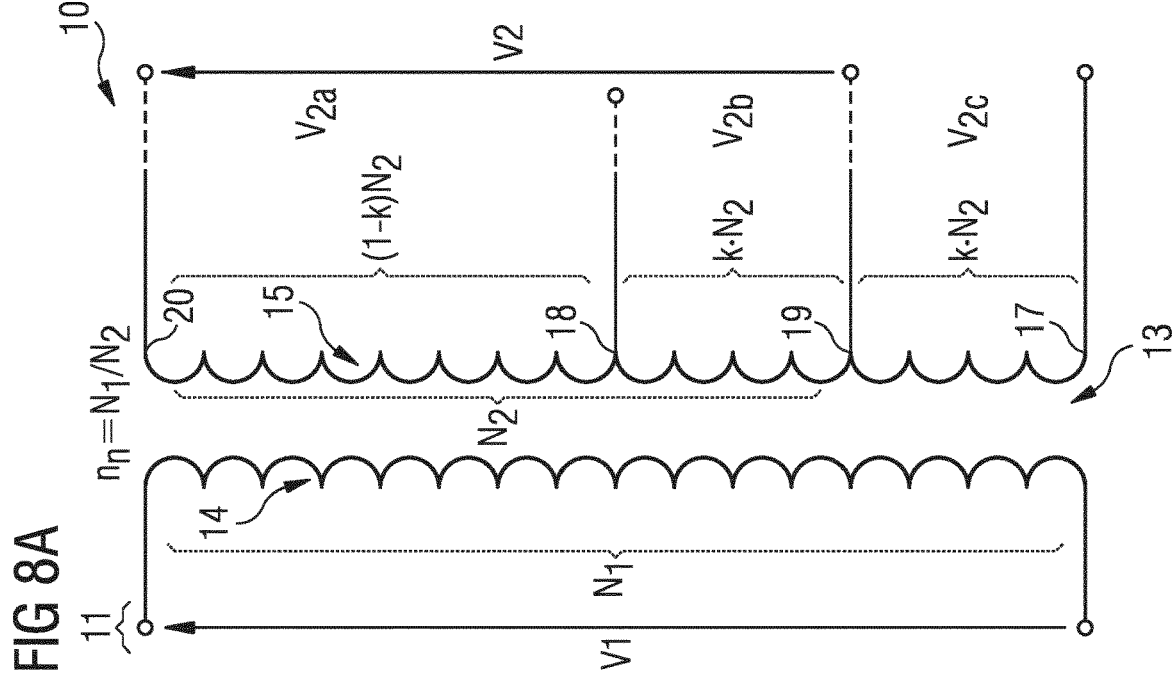
Figure 10:
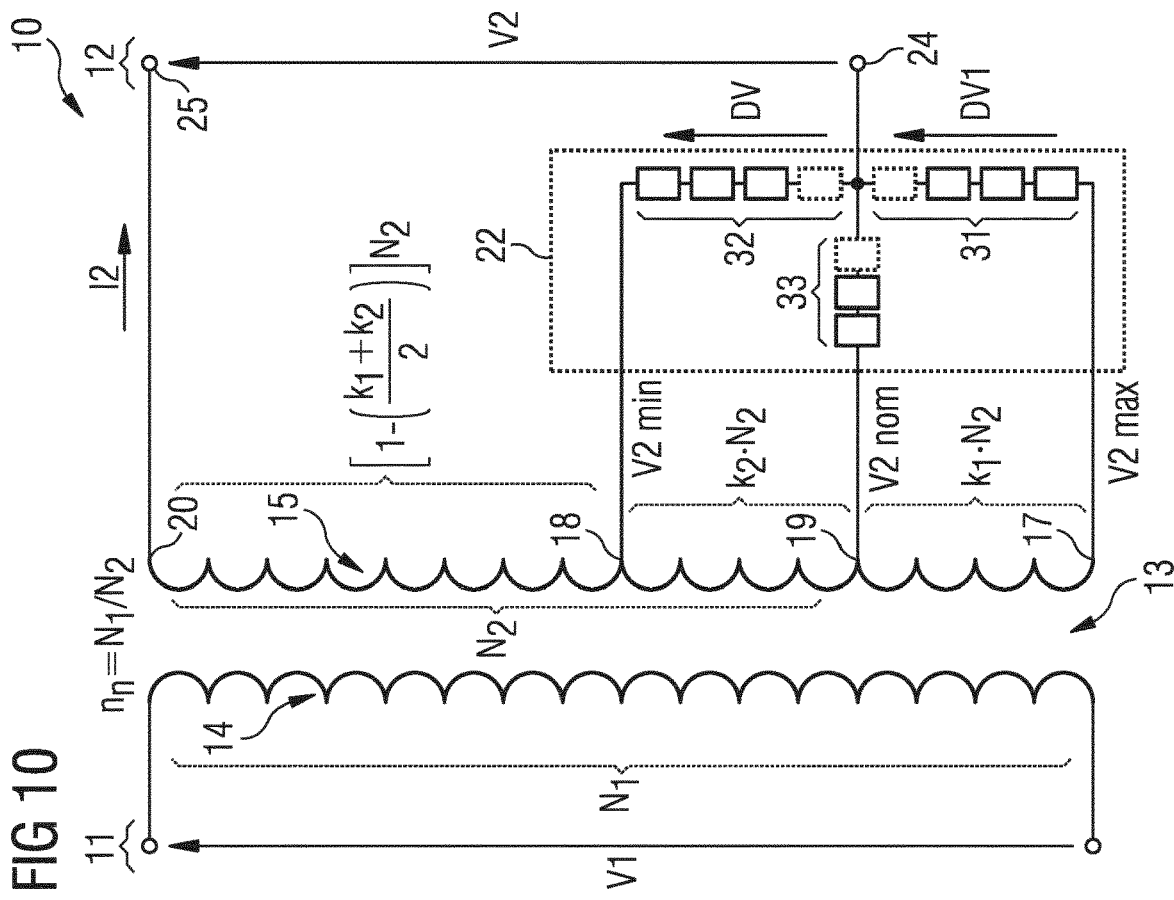

FIGS. 8A and 8B show an example embodiment of the voltages of a transformer arrangement 10 and a control scheme of a transformer arrangement 10 which is a further development of the embodiments shown above. $N_1$ is the number of windings of the first windings 14. $N_2$ is the number of windings of the second windings 15 from the third tap 19 to the fourth tap 20. $n_n$ is a ratio. k is a factor less than 1. The third tap 19 is located between the first tap 17 and the second tap 18 at the second windings 15. Windings of the second windings 15 couple the third tap 19 to the second tap 18. A number of these windings is e.g., $N_2 \cdot k$ or $N_2 \cdot k2$ (as shown in FIG. 10). Further windings of the second windings 15 couple the third tap 19 to the first tap 17. A number of the further windings is e.g., $N_2 \cdot k$ or $N_2 \cdot k1$. Additional windings of the second windings 15 couple the second tap 18 to the fourth tap 20. $V_{2a}$ is a voltage tapped between the second tap 18 and the fourth tap 20. $V_{2b}$ is a voltage tapped between the third tap 19 and the second tap 18. $V_{2c}$ is a voltage tapped between first tap 17 and the second tap 18. $V_1^n$ is a nominal value of the first voltage V1. $V_2^n$ (=V2nom) is a nominal value of the second voltage V2. $V_2^{min}$ (=V2min) is a minimum value of the second voltage. $V_2^{max}$ (=V2max) is a maximum value of the second voltage.

There are several possible control schemes. A simple voltage control, at constant switching frequency $f_{sw}$ can be implemented so that for a given desired value $V_{ref}$ of the second voltage V2 the operation mode and duty cycle is selected (mode 1 to mode 3) and $\delta = t_{on}/T_{sw}$ to get the desired value $V_{ref}$ as described below. The second voltage V2 can be adjusted in less than ½ cycle of the grid frequency. δ is the duty cycle. $T_{sw}$ is a time period being the duration of one cycle. $t_{on}$ is a period for conducting of one of the arms 31 to 33.

Figure 9:
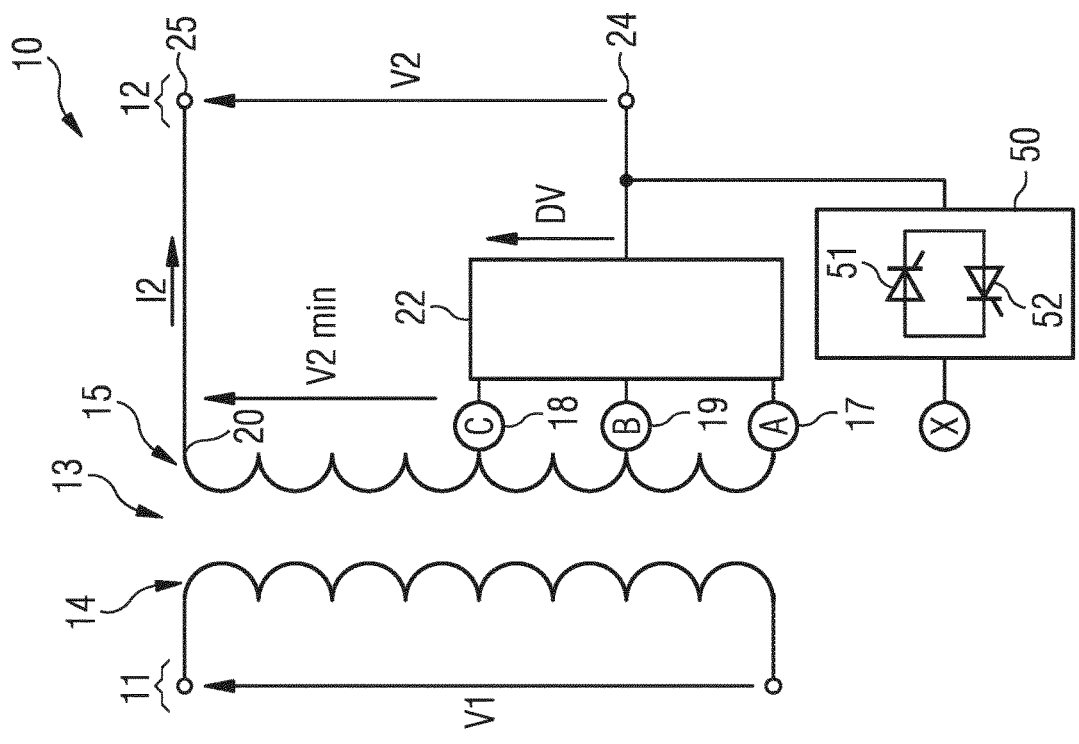

FIG. 9 shows a further example embodiment of a transformer arrangement 10 which is a further development of the embodiments shown above. The transformer arrangement 10 comprises a by-pass switch 50. The by-pass switch 50 is realized by two switches 51, 52 such as e.g., two thyristors that are connected in an antiparallel circuit. The by-pass switch 50 couples the first terminal 24 of the second arrangement side 12 to a further node such as the first tap 17, the second tap 18 or the third cap 19. To reduce the cost and the oversizing, the converter 22 is protected against external short-circuits currents. Anti-parallel thyristors to by-pass the converter during faults can be implemented as displayed in FIG. 9. The terminal X can be connected to the nodes A, B or C (depending on the design). Thus, a by-pass switch 50 or by-pass switches are configured for short-circuit protection (thyristors or other technology can be used).

As mentioned above, basic objectives of the transformer arrangement 10 (with the OLTC PE AC-AC converter 22) are e.g., fast and continuous voltage regulation of the transformer; and/or to mitigate voltage flickers.

The transformer arrangement 10 will be designed according to the rated power of the transformer arrangement 10, the voltage and the system short-circuit current. Main considerations are e.g.:

The converter voltage rating will depend on the requirements of the voltage regulation range ($\Delta V_{max}$) and the nominal current;

The device current rating of the PE AC-AC OLTC converter 22 shall withstand system short-circuit current;

Different combination of semiconductor device types can be used: IGBTs, bi-mode insulated gate transistors (abbreviated BIGTs), MOSFETs, IGCTs and the semiconductor material can be Si or SiC;

Redundant switches (and the additional required devices) that allow converter operation in case some switches fail. The number of redundant switches depend on the reliability/availability requirements;

A proper control for reliable switching in normal operation;

Outer-loop controllers depending on regulation functionality;

Fast response to fault currents (by-pass of a short-circuit current, abbreviated SCC);

Protection against voltage impulses (e.g., due to lightning or switching transients in the grid); and/or Converter may further be implemented with low-cost conventional air-cooling or two-phase cooling concept (conventional liquid cooling environment is not required).

In the following figures further variations of the transformer arrangement 10 are illustrated:

FIG. 10 shows an example embodiment of a transformer arrangement 10 which is a further development of the embodiments shown above. Depending on the requirements and the design, the second voltage V2 can be controlled between a maximum value (V2max=V2nom+DV1) and a minimum value (V2min=V2nom−DV). The upper range and lower range can be different (DV1≠DV) as shown in FIG. 10. In this case, the first number N1 of cells 29 may be different from the second number N2 of cells 29. In FIG. 10, the transformer arrangement 10 realizes a single-phase AC-AC PE converter as OLTC connected at LV side (can also be connected on the HV side).

Figure 11A:
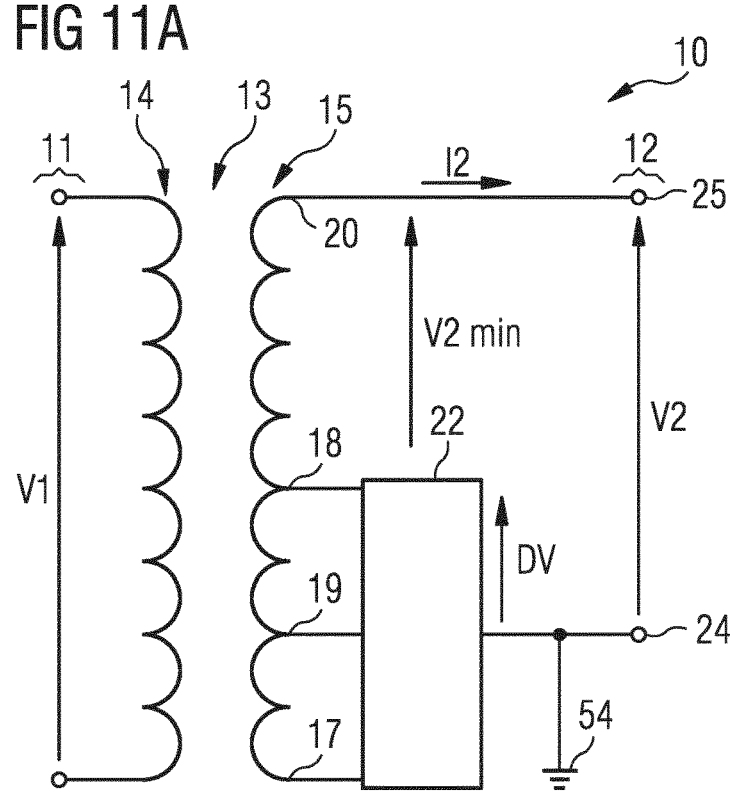
Figure 11B:
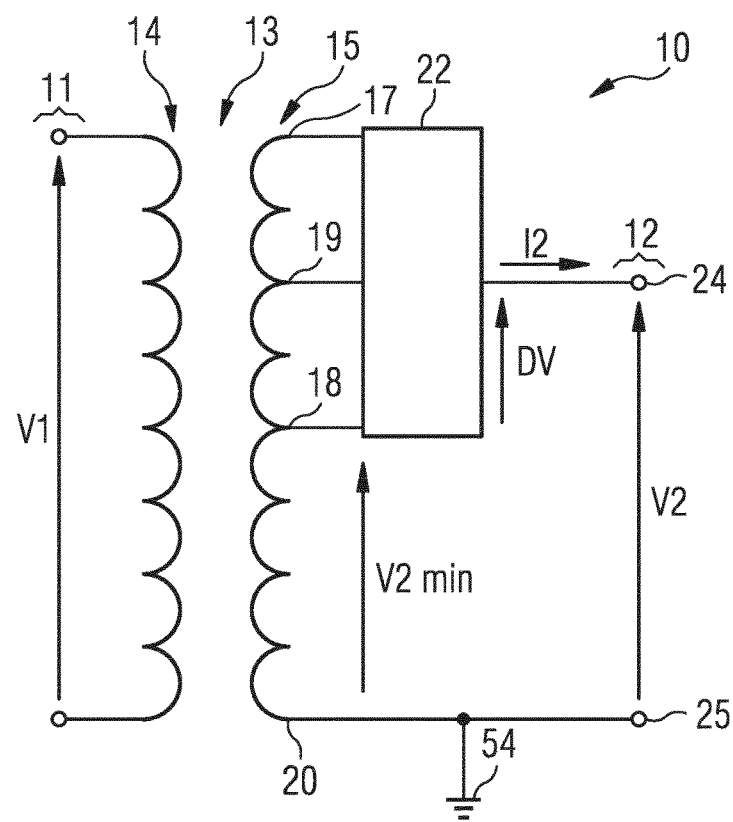

FIGS. 11A and 11B show example embodiments of a transformer arrangement 10 which is a further development of the embodiments shown above. The transformer arrangement 10 can be connected to a ground 54 or reference potential terminal, as explained and shown in FIG. 11A or floating as shown in FIG. 11B. The transformer arrangement 10 can have a grounded PE converter or a floating PE OLTC AC-AC converter. The first terminal 24 (FIG. 11A) of the second arrangement side 12 or the second terminal 25 (FIG. 11B) of the second arrangement side 12 is connected to the ground 54.

Figure 12:
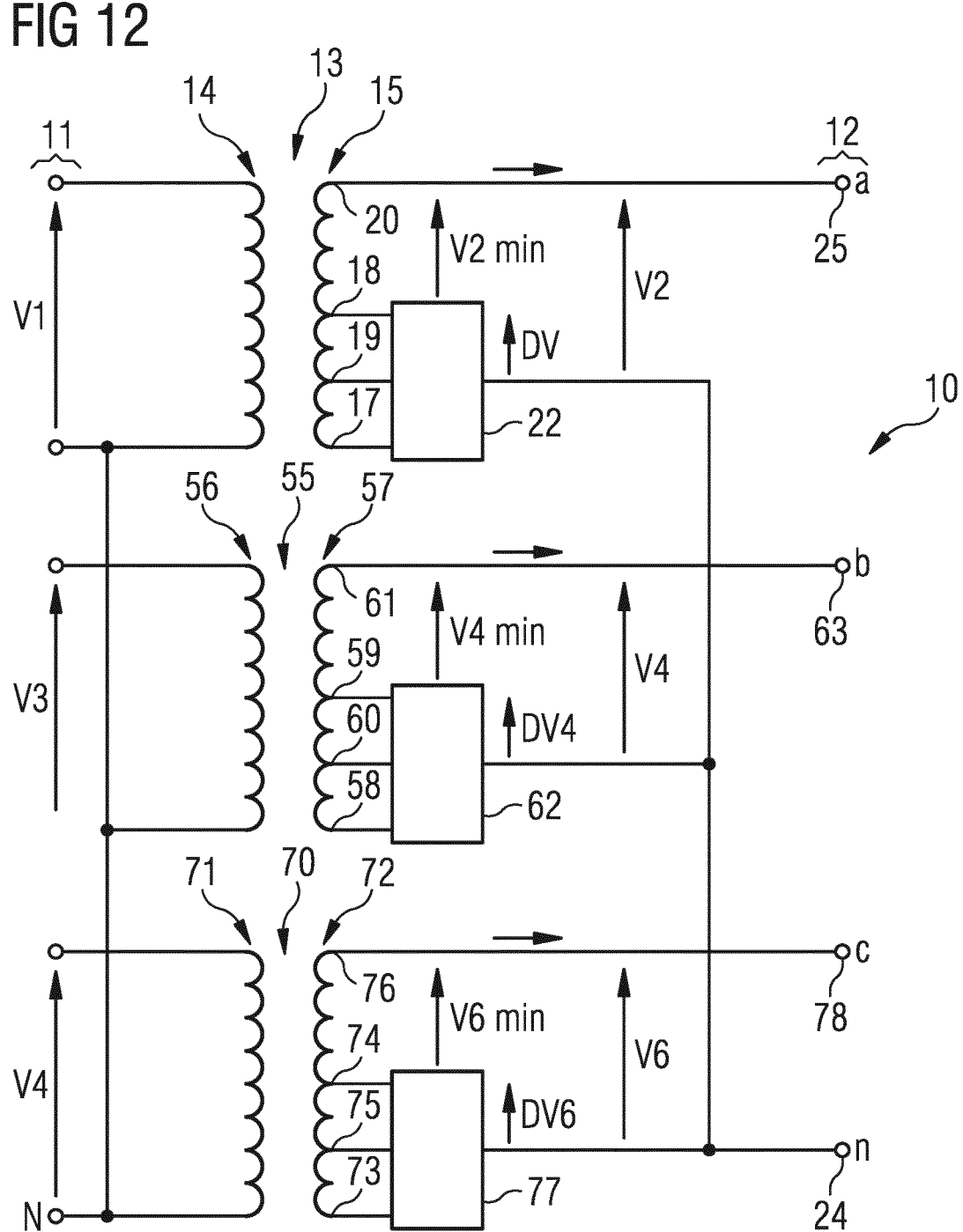
FIG. 12 shows a further example embodiment of a transformer arrangement with three phases.

FIG. 12 shows a further example embodiment of a transformer arrangement 10 with three phases which is a further development of the embodiments shown above. The transformer arrangement 10 comprises a further transformer 55 that is realized correspondingly to the transformer 13. The further transformer 55 comprises first and second windings 56, 57. The second windings 57 include a first to a fourth tap 58 to 61. Moreover, the transformer arrangement 10 comprises a further converter 62 coupled to the first, second and third tap 58 to 60. Additionally, the second side 12 of the transformer arrangement 10 comprises a third terminal 63. A terminal of the further converter 62 is connected to the first terminal 24 of the second arrangement side 12.

Furthermore, the transformer arrangement 10 comprises an additional transformer 70 with first and second windings 71, 70. The second windings 72 include a first to a fourth tap 73 to 76. The transformer arrangement 10 comprises an additional converter 77 that is connected to the first, second and third tap 73 to 75. A terminal of the additional converter 77 is connected to the first terminal 24 of the second arrangement side 12. A fourth terminal 78 of the second arrangement side 12 is connected to the fourth tap 76. Thus, at the second arrangement side 12, three phases a, b and c can be tapped at the second, the third and the fourth terminal 25, 36, 78. A neutral phase n may be tapped at the first terminal 24 of the second arrangement side 12.

A third voltage V3 is provided to the first windings 56 of the further transformer 55. The further converter 62 generates a fourth voltage V4. A fifth voltage V5 is provided to the first windings 71 of the additional transformer 70. The additional converter 77 generates a sixth voltage V6. Voltage differences DV4, DV6 and minimum voltages V4min, V6min can be tapped at the further converter 62 and the additional converter 77.

The converter 22 for a single-phase transformer can be used in three phase transformer banks, or three phase transformers in any of its connections: star-delta YD, delta-star DY, delta-delta DD or star-star YY, or other as well as at the HV side or LV side. A seen in FIG. 12, three-phase connection (YY) of the transformed arrangement 10 is realized at LV side. Other three-phase connections as YD, DY and DD are also possible. Connection of the converter 22, 52, 77 at HV side is also possible.

Figure 13A:
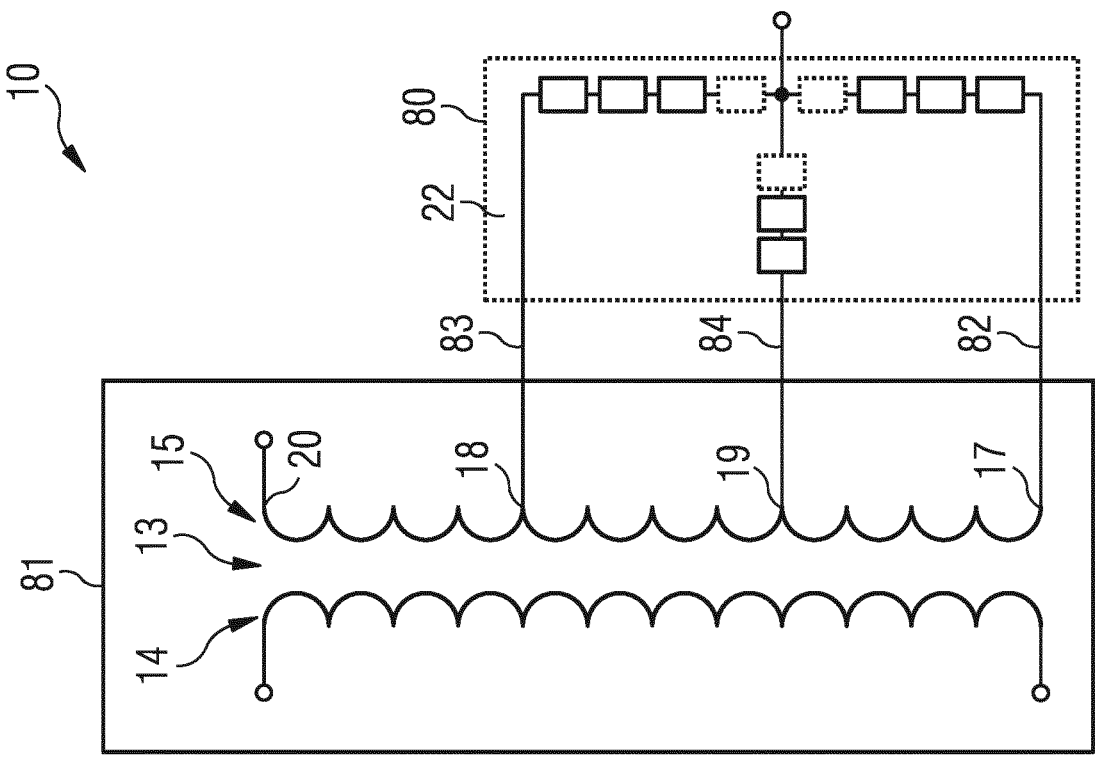
FIGS. 13A and 13B show example embodiments of a transformer arrangement with a tank.
Figure 13B:
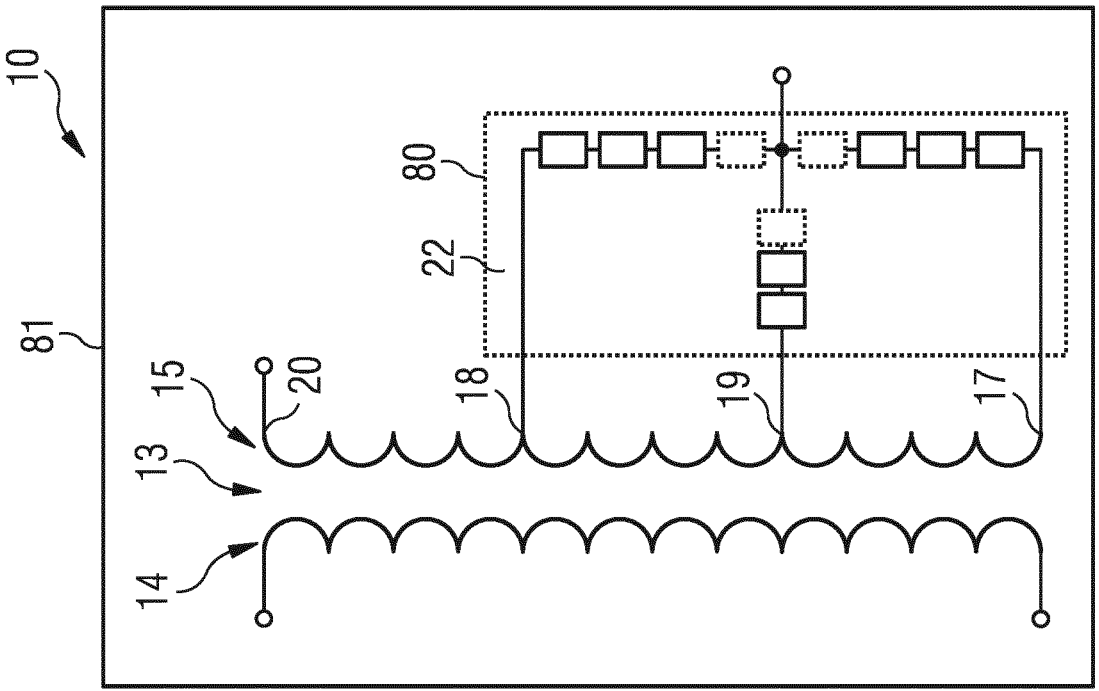

FIGS. 13A and 13B show example embodiments of a transformer arrangement 10 with a tank 80 which is a further development of the embodiments shown above. As shown in FIG. 13A, the transformer arrangement 10 comprises a box 80. The converter 22 is inserted in the box 18. Additionally, the first and the second filter circuit 34, 35 and the filter circuitry 23 (not shown) may also be inserted into the box 18. The transformer arrangement 10 comprises a tank 81. The transformer 13 is inserted into the tank 81. Additionally, the box 80 is also inserted into the tank 81.

As shown in FIG. 13B, the box 80 is not inserted into the tank 81. The box 80 is outside of the tank 81. Thus, the tank 81 is free from the box 80. The transformer arrangement 10 comprises bushings 82 to 84 that couple the tank 81 to the box 80. The bushings 82 to 84 couple the first to the third tap 17 to 18 to the converter 22.

The OLTC AC-AC PE converter 22 can be built as a separate unit and connected to the transformer 13 in a substation, it can also be integrated inside the transformer tank 81 or assembled in an external box 80 which can be named container as a modular backpack solution as shown in FIGS. 13A and 13B respectively. In FIG. 13A, the transformer 13 and the converter 22 are mounted in the same tank 81. In FIG. 13B, the transformer 13 and the converter 22 are realized in a backpack modular solution.

FIGS. 14A to 14D show different example embodiments of a transformer arrangement 10 which are further developments of the embodiments shown above. The PE converter 22 shown in FIGS. 1, 2A and 2B represents one way of implementing the basic function of voltage regulation by employing three transformer taps 17 to 19. However, the same functionality can be implemented by other circuit variations, which are briefly described in the following paragraphs and figures. The symbols depicted and defined e.g., in FIGS. 3A to 3F are used for describing the circuit variations. A short description of each variation is summarized as follows.

Figure 14A:
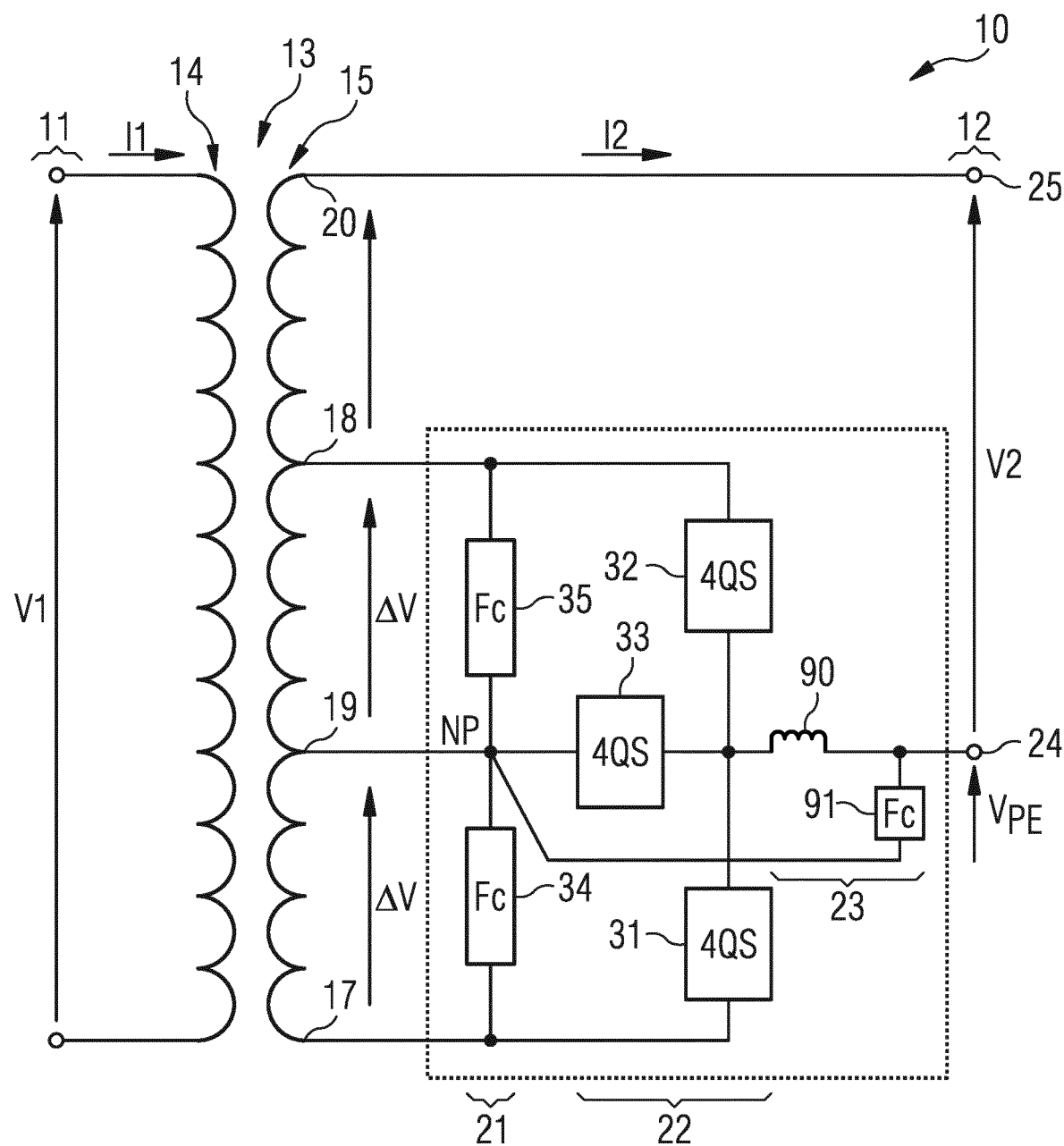
FIGS. 14A to 14D show different example embodiments of a transformer arrangement.

FIG. 14A shows an example embodiment of a transformer arrangement 10 which is a further developments of the embodiments shown above. In FIG. 14A, the transformer arrangement 10 represents a variation of the initial circuit shown in FIGS. 1, 2A and 2B. In FIG. 14A, each arm 31 to 33 is represented by the 4QS symbol (defined and described in FIGS. 3A to 3D) and the filter arrangement 21 and the filter circuitry 23 have been added. The first and the second filter circuit 34, 35 form the filter arrangement 21, also named input filter.

The filter arrangement 21 is mainly capacitive. As shown in FIG. 3F, the filter arrangement 21 may include resistive elements, introduced for damping electrical resonances.

The filter circuitry 23 coupling the converter 22 to the second side 12 of the transformer arrangement 10 is a low-pass filter. The filter circuitry 23 comprises an inductive element 90 and a capacitive element 91 such as shown in FIGS. 2E and 2F (with possibility to introduce resistive elements for damping oscillations between the inductive element 90 and the capacitive element 91 of the filter circuitry 23). This is only one potential filter implementation. Other implementations are possible. Moreover, the lower terminal of the capacitive element 91 of the filter circuitry 23 is connected to a neutral point NP. The neutral point NP is connected to the third tap 19. Alternatively, it is possible to connect this terminal to the upper terminal of the top auxiliary winding or to the lower terminal of the bottom auxiliary winding that means to connect this terminal to the first or the second tap 17, 18.

In FIG. 14A, this circuit variation represents the circuit shown in FIG. 2A complemented with a low-pass LC filter 23 for filtering out the switching harmonics of the converter 22. The capacitive element 91 and the first and the second filter 34, 35 can be realized as the first filter 34, explained in FIGS. 3E and 3F and in the description of FIGS. 3E and 3F and as indicated by the letters Fc. The first to the third arm 31 to 33 are each implemented by at least a four-quadrant switch, as explained together with FIGS. 3A to 3D and as indicated by the letters 4QS.

The first arm 31 is realized by a cell 29 (as shown e.g., in FIGS. 3A and 3B), a series circuit of cells 29 (as shown in FIG. 2A) or a matrix 30 of cells 29 (as shown in FIGS. 2B, 3C and 3D). The second and the third arm 32, 33 are realized such as the first arm 31.

Figure 14B:
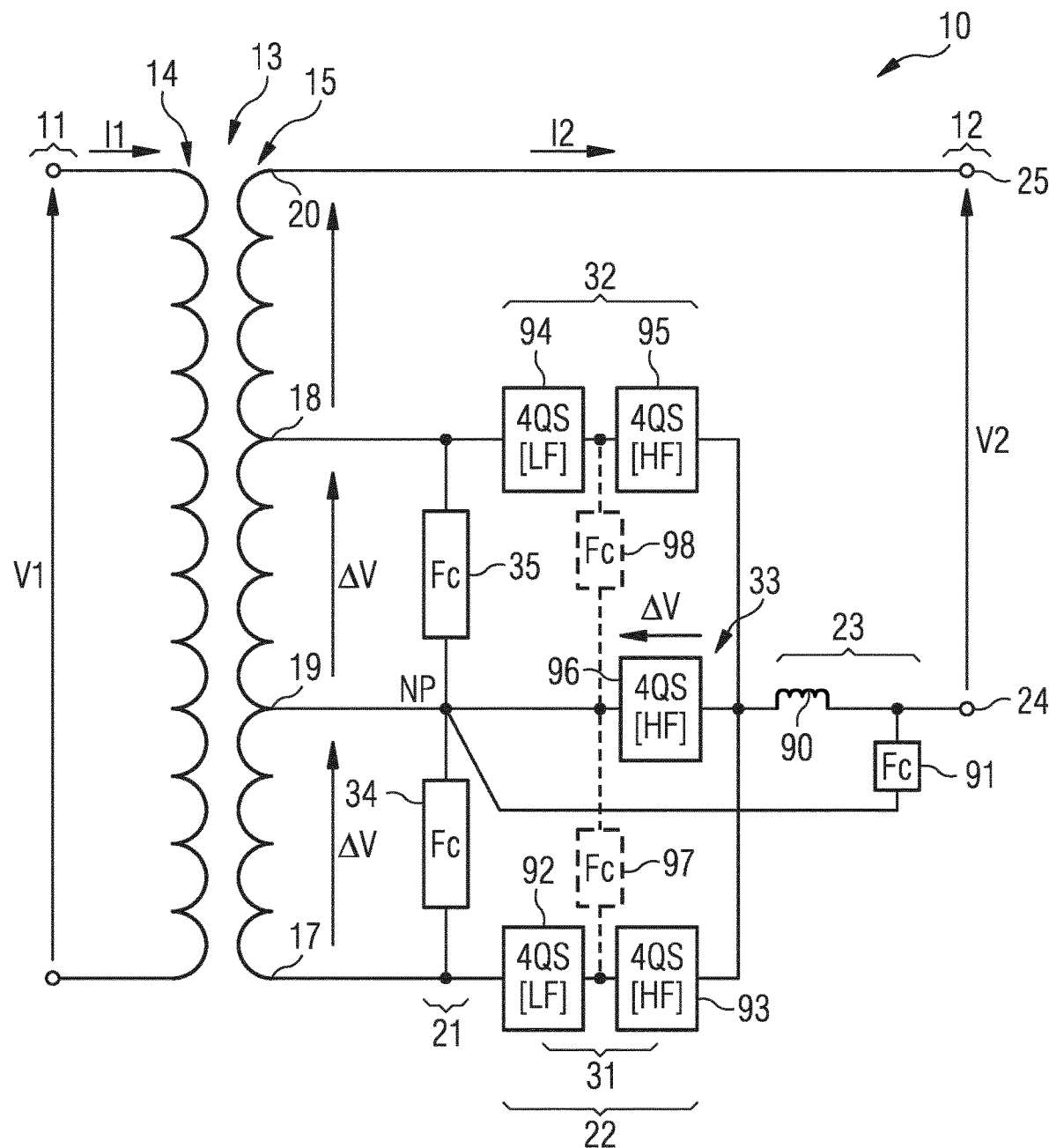

FIG. 14B shows an example embodiment of a transformer arrangement 10 which is a further developments of the embodiments shown above. The circuit variation shown in FIG. 14B is based on the one shown in FIG. 14A. However, the upper and lower arms (i.e., the first and the second arm 31, 32 are split in two parts; notably, one part 92, 94 is operating at low switching frequency (abbreviated LF) and one part 93, 95 is operating at high switching frequency (abbreviated HF). Thus, the first arm 31 comprises a first LF part 92 and a first HF part 93. The second arm 32 comprises a second LF part 94 and a second HF part 95. The third arm 33 comprises a third HF part 96. The first and the second LF part 92, 94 include a cell 29″ of the second type. Moreover, the first, the second and the third HF part 93, 95, 96 include a cell 29′ of the first type. LF is the abbreviation for low frequency and HF is the abbreviation for high frequency. A HF part can be named part of a first type. A LF part can be named part of a second type. The HF part or HF parts are realized different from the LF part or LF parts. The third arm 33 is e.g., free from a LF part.

This variation is different to the initial circuit shown in FIG. 2A in terms of operation, in the sense that the first, the second and the third HF part 93, 95, 96 regulate the second voltage V2, while the first and the second LF part 92, 94 clamp the first and the second HF part 93, 95 to one of the auxiliary windings. Thus, all switching operations are realized by the first, second and third HF parts 93, 95, 96, while the first and the second LF parts 92, 94 are continuously in a conducting state (they are ON). In an example, one of the first and the second LF part 92, 94 is in a conducting state, while the other of the first and the second LF part 92, 94 is in a non-conducting state. The operation of this transformer arrangement 10 is briefly described in FIGS. 15A to 15C.

A HF part or a LF part can be realized by a cell 29 (as shown e.g. in FIGS. 3A and 3B), a series circuit of cells 29 (as shown in FIG. 2A) or a matrix 30 of cells 29 (as shown in FIGS. 2B, 3C and 3D). A HF part is indicated by the letters 4QS [HF] and a LF part is indicated by the letters 4QS [LF] in the drawings 14B to 14D.

This variation is different to the initial circuit shown in FIGS. 2A, 2B in the sense that the split of the arms in LF and HF parts offers the opportunity to minimize total losses by employing different devices. Notably, devices optimized for low conduction losses (e.g., IGBTs of voltage classes 4.5, 6.5 kV, BIGTs, PCTs, BCTs) can be used for the LF parts 92, 94, while devices optimized for low switching losses (e.g., Si-based IGBTs of voltage classes 1.2, 1.7 kV, SiC-based IGBTs, SiC-based MOSFETs) are used for the HF parts 93, 95, 96.

This variation is similar to the initial circuit shown in FIGS. 1, 2A and 2B in the following aspects: The total voltage rating of semiconductor devices is the same, and if the second voltage V2 has to be equal to the nominal voltage V2nom, the third arm 33 (called middle arm) offers a path with low conduction losses. The filter circuitry 23, called output L-Fc filter, can be connected to the neutral point NP or another terminal, e.g., the second tap 18 (called upper terminal of the top auxiliary winding) or the first tap 17 (called lower terminal of the bottom auxiliary winding).

The converter 22 comprises a first and a second internal filter 97, 98. The first and the second internal filter 97, 98 are implemented e.g., such as the first filter circuit 34. The first and the second internal filter 97, 98 may be low-pass filters. The first internal filter 97 couples the node between the first LF part 92 and the first HF part 93 of the first arm 31 to the neutral point NP. Correspondingly, the second internal filter 98 couples the node between the second LF part 94 and the second HF part 95 of the second arm 32 to the neutral point NP. The internal filter 97, 98 can be introduced for reducing the voltage stress (e.g. as snubber) of the HF components during switching operations. The internal filter 97, 98 are optional, as denoted by dashed lines in FIG. 14B. In FIG. 14B, the converter 22 splits the first and the second arm 31, 32 in two parts: one that operates at low switching frequency [LF] and one that operates at high switching frequency [HF]. Input and output capacitors can be replaced by capacitors connected in series with resistors (see FIGS. 3E and 3F).

Figure 14C:
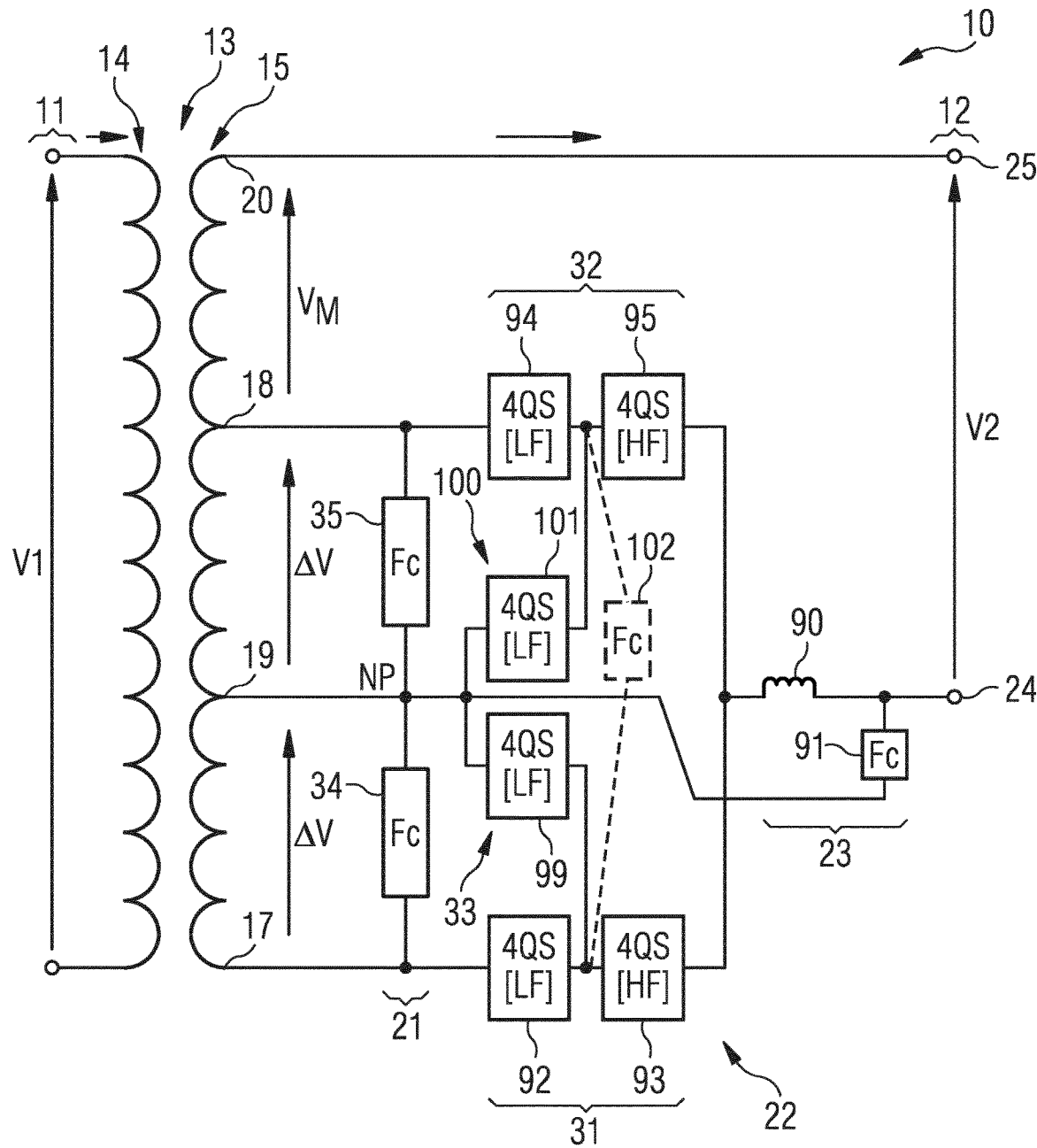

FIG. 14C shows an example embodiment of a transformer arrangement 10 which is a further development of the embodiments shown above. As shown in FIG. 14C, the third arm 33 couples the third tap 19 to a node of the first arm 31. The node is located between the first LF part 92 and the first HF part 93 of the first arm 31. The first number N1 of cells of the first arm 31 is larger than 1. The node of the first arm 31 is coupled via at least one cell to the first terminal of the first arm 31 and via at least one cell to the second terminal of the first arm 31. The third arm 33 comprises a LF part 99. The converter 22 comprises a fourth arm 100 that couples the third tap 19 to a node of the second arm 32. The node is arranged between the second LF part 94 and the second HF part 95 of the second arm 32. The second number N2 of cells of the second arm 32 is larger than 1. The node of the second arm 32 is coupled via at least one cell to the first terminal of the second arm 32 and via at least one cell to the second terminal of the second arm 32. The fourth arm 100 comprises a LF part 101.

The transformer arrangement 10 shown in FIG. 14C is based on the structure of an active neutral-point clamp converter.

Figure 16A:
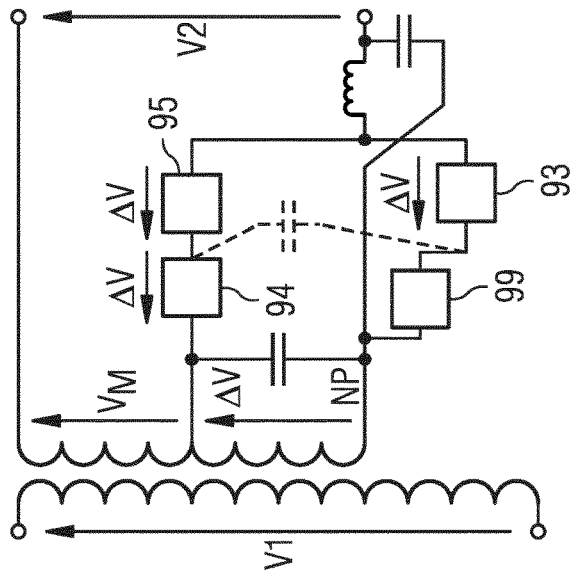
Figure 16B:
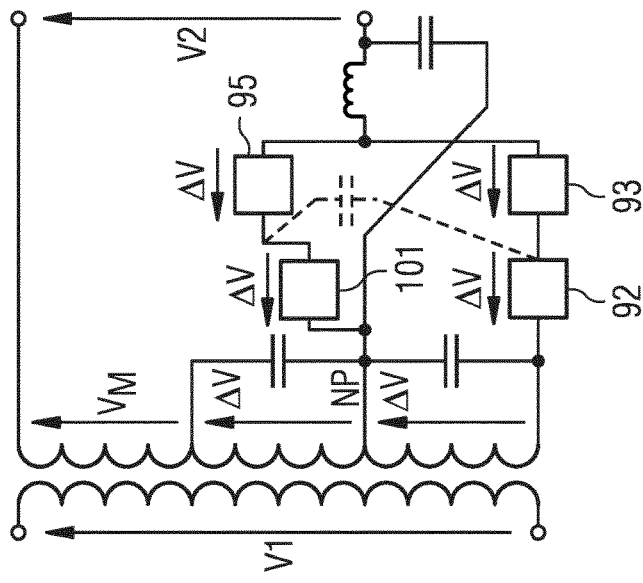
Figure 16C:
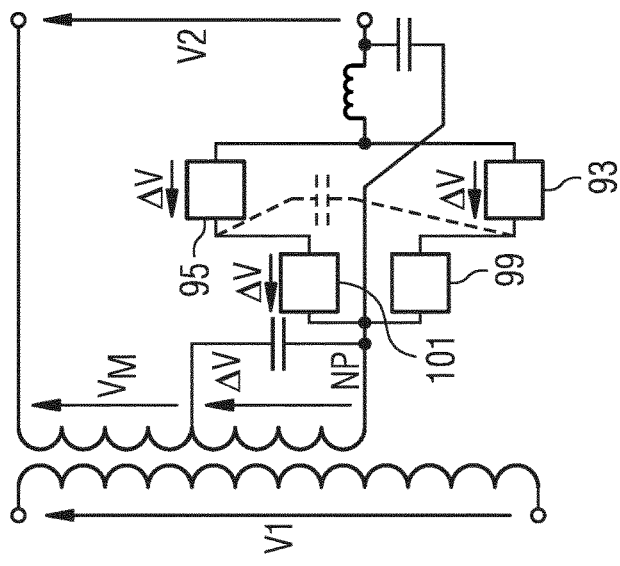

Similar to the previous circuit variation, there are two types of parts: one type operating at low switching frequency [LF] and one type operating at high switching frequency [HF]. The HF parts 93, 95 are performing voltage regulation, while the LF parts 92, 94, 99, 101 clamp the HF parts 93, 95 to one of the first or the second tap 17, 18 (realized by auxiliary windings). Thus, all switching operations are realized by the HF parts 93, 95, while the LF parts 92, 94, 99, 101 are continuously ON. The operation of this circuit variation is briefly described in FIGS. 16A to 16C. As shown in FIG. 16A to 16C, if the second voltage V2 has to be equal to the nominal voltage V2nom, the parallel connection of two LF-HF branches can offer a path with low conduction losses. The converter 22 may comprise an internal filter 102 that may be realized as the first filter circuit 43, shown in FIG. 3E or 3F. Yet, if the optional internal filter 102 is present, the activation of this path is done with care for avoiding inrush currents due to discharging of the capacitor of the internal filter 102 (e.g., activation can be performed at the zero crossing of the voltage across the internal filter 102).

Similar to the circuit variation of FIG. 14B, this variation offers the opportunity to minimize total losses by employing different devices. For example, devices optimized for low conduction losses (e.g., IGBTs of voltage classes 4.5, 6.5 kV, BIGTs, PCTs, BCTs) can be used for the LF parts 92, 94, 99, 101, while devices optimized for low switching losses (e.g., Si-based IGBTs of voltage classes 1.2, 1.7 kV, SiC-based IGBTs, SiC-based MOSFETs) can be used for the HF parts 93, 95.

The total voltage rating of semiconductor devices for this circuit variation is higher than that of the circuit variation of FIGS. 14A and 14B. The filter circuitry 23 (named output L-Fc filter) can be connected to the neutral point NP or other terminals, e.g., the second tap 18 (upper terminal of the top auxiliary winding) or the first tap 17 (lower terminal of the bottom auxiliary winding), or to one of the midpoints between the upper or lower LF and HF parts. The optional internal filter 102 (denoted by dashed lines in FIG. 14C) can be introduced for reducing the voltage stress (e.g., as snubber) of the HF components during switching operations. In FIG. 14C, the circuit variation is based on active neutral-point clamped structure. The HF parts 93, 95 perform voltage regulation, while the LF parts 92, 94, 199, 101 clamp the HF part 93, 95 to either of the two auxiliary windings of voltage Δv.

Figure 14D:
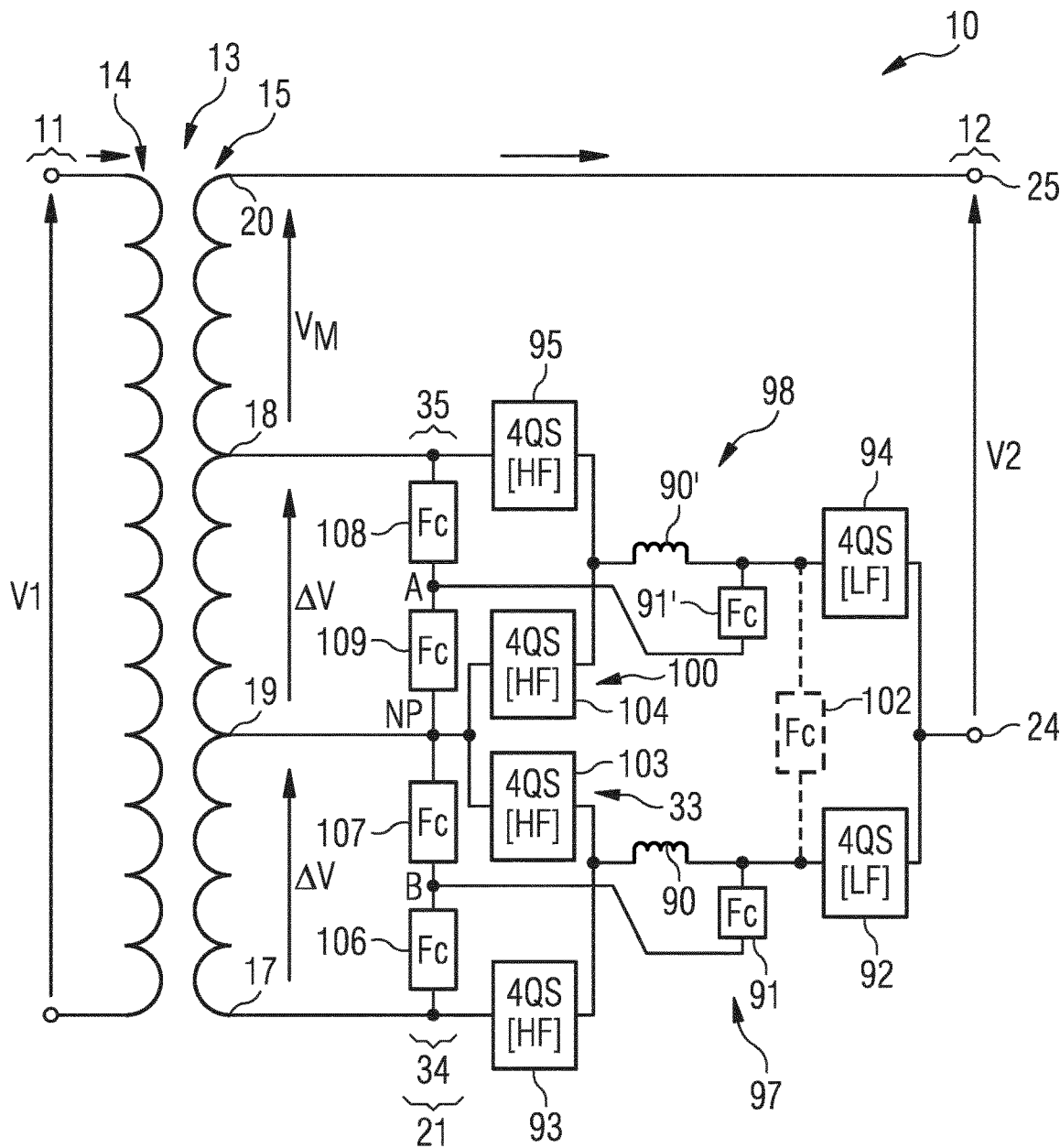

FIG. 14D shows an example embodiment of a transformer arrangement 10 which is a further development of the embodiments shown above. The transformer arrangement 10 shown in FIG. 14D is based on the one of in FIG. 14C, but the placement of the HF and LF parts is swapped, i.e., the HF parts are now placed closer to the taps 17 to 19 (i.e., closer to the auxiliary windings). The change does not have any implication to the total voltage rating of semiconductor devices compared to the circuit variation of FIG. 14C. Yet, it has an impact on the internal filters 97, 98. The converter 22 comprises the first and the second internal filter 97, 98. The first internal filter 97 is coupled via the first HF part 93 of the first arm 31 to the first tap 17 and via the third arm 33 to the third tap 19. The first internal filter 97 is coupled via the first LF part 92 of the first arm 31 to the first terminal 24 of the second arrangement side 12. The third arm 33 includes a HF part 103.

Correspondingly, the second internal filter 98 is coupled via the second part 95 of the second arm 32 to the second tap 18 and via the fourth arm 100 to the third tap 19. The fourth arm 100 comprises a HF part 104. The second internal filter 98 is coupled via the second LF part 94 of the second arm 33 to the first terminal 24 of the second arrangement side 12. The first and the second internal filter 97, 98 each include an inductive element 90, 90' and a capacitive element 91, 91' The first and the second internal filter 97, 98 are arranged close to the HF parts 93, 95, 103, 104 for filtering the harmonics of the HF parts 93, 95, 103, 104. The first and the second internal filter 97, 98 replace the filter circuitry 23 or the output L-Fc filters.

One terminal of the first internal filter 97 is connected to a point B. One terminal of the second internal filter 98 is connected to a point A. The potential of these points A, B may be floating with respect to the neutral phase NP and in an example may become equal to Av. Thus, larger input capacitance may be required compared to the circuit variation of FIG. 14C. Moreover, the aforementioned terminals of the L-Fc filters connected to points A and B can alternatively be connected either to the first and the second tap 17, 18 (lower terminal of the bottom auxiliary winding and upper terminal of the top auxiliary winding) or both to the neutral point or neutral phase NP.

The first filter circuit 34 comprises a first and a second filter element 106, 107 connected to each other via the point B in a series connection. The second filter circuit 35 comprises a third and a fourth filter element 108, 109 connected to each other via the point A in a series connection.

Regarding the operation of this variation, only one HF and one LF part are active at a time. Notably, one of the HF parts is performing voltage regulation, while the corresponding LF part clamps the output of the HF part to the second terminal 24 of the second arrangement side 12. The operation of this circuit variation is briefly described in FIGS. 17A and 17B. The internal filter 102 is optional (denoted by dashed lines in FIG. 14B) and can be introduced for reducing the voltage stress (e.g., as snubber) of the HF components during switching operations.

In FIG. 14D, the transformer arrangement 10 is based on an active neutral-point clamped structure, but differs from the circuit variation in FIG. 14C in terms of the location of the LF and HF parts. The HF part that performs voltage regulation is located closer to the auxiliary windings; the LC filters 97, 98 required to filter the HF harmonics are placed close to the HF parts of the converter 22.

In the proposal and the design described in this disclosure, at least one of the following features are implemented: The power electronic AC-AC converter topology allows transformer voltage and flicker mitigation. The converter 22 can be assembled using anti-series connected Si/SiC based devices such as IGBTs, BIGTs, and/or MOSFETs, etc. The control strategy includes three operation modes (see FIGS. 7A to 7C). The converter 22 is assembled in the same tank 81 of the transformer 13 or as a backpack modular solution outside of the tank 81 of the transformer 13 (FIGS. 13A and 13B) (or as a separate unit). The circuit variations presented in FIG. 14A to 14D implement the same function as the circuit variation shown in FIGS. 1, 2A and 2B.

Advantageously, the transformer arrangement 10 may have benefits, such that it is faster, cheaper, safer etc. The transformer arrangement 10 performs a replacement of the step-by-step traditional electromechanical OLTC; there are simplified design requirements for the transformer 13 (transformer design simplification); transformer manufacturing costs are reduced (mechanical design, less additional windings); power electronic losses are reduced compared with prior art; the transformer arrangement realizes and improved compactness of unified transformer-PE block compared with conventional OLTC solution; the transformer arrangement 10 includes extended functionalities of the transformer (i.e., flicker mitigation).

FIGS. 15A to 15C show examples of modes of a transformer arrangement 10 of FIG. 14B. Illustration of operation of circuit variation is shown in FIG. 14B. As shown in FIG. 15A, the second voltage V2 should be in the range 0.9 to 1 p.u. (p.u. means that the second voltage V2 is provided in the per-unit system). The second LF part 94 of the second arm 32 is continuously on. The second HF part 95 of the second arm 32 and the third HF part 96 of the third arm 33 are switching.

In FIG. 15B, the second voltage V2 should be in the range 1.0 to 1.1 p.u. The first LF part 92 of the first arm 31 is continuously on. The first HF part 93 of the first arm 31 and the third HF part 96 of the third arm 33 are switching.

In FIG. 15C, the second voltage V2 should be about 1.0 p.u. The third HF part 96 of the third arm 33 is on. An output filter impedance is inserted in the current path.

FIGS. 16A to 16C shows examples of modes of a transformer arrangement of FIG. 14C. As shown in FIG. 16A, the second voltage V2 should be in the range 0.9 to 1 p.u. The upper auxiliary windings having the second and the third tap 18, 19 are connected to HF parts 93, 95 by two LF parts 94, 99 being continuously on. The HF parts 93, 95 are switching to regulate the second voltage V2.

In FIG. 16B, the second voltage V2 should be in the range 1.0 to 1.1 p.u. The lower auxiliary windings having the first and the third tap 17, 19 are connected to HF parts 93, 95 by two LF parts 94, 101 which are continuously on. The HF parts 93, 95 are switching to regulate the second voltage V2.

In FIG. 16C, the second voltage V2 should be about 1.0 p.u. Low conduction losses are achieved by parallel-connected LF and HF parts. Activation of this path is done carefully to avoid short of dashed capacitors. Input and output capacitors can be replaced by capacitors connected in series with resistors (see FIGS. 3E and 3F).

Figure 17A:
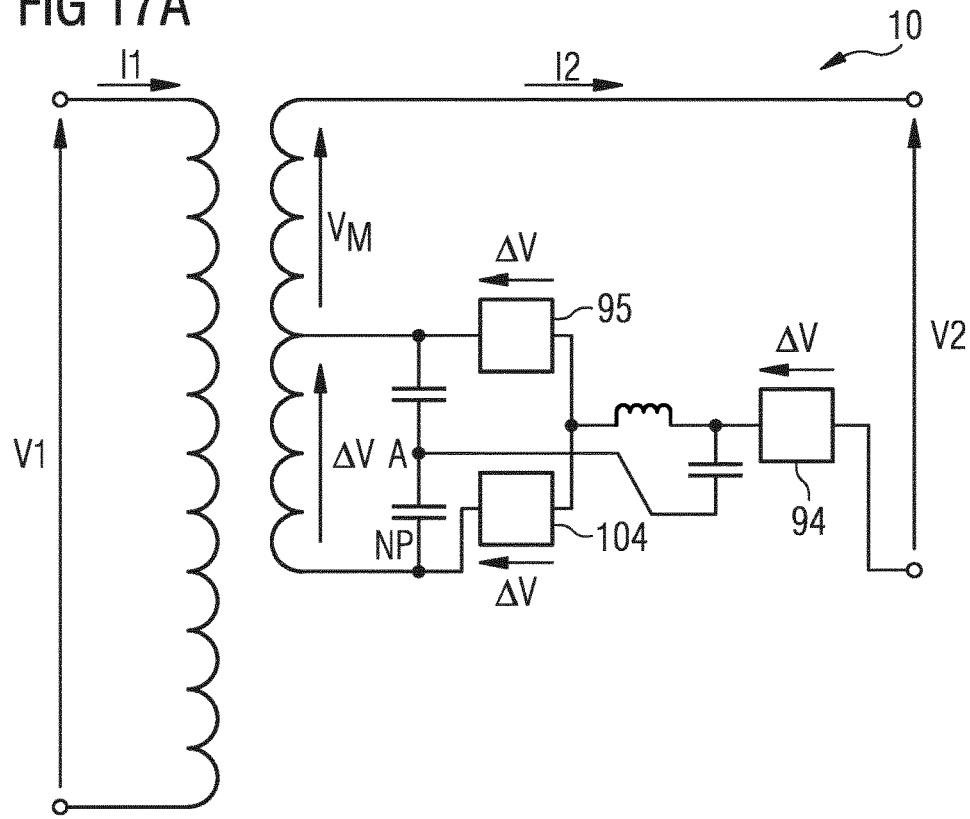
Figure 17B:
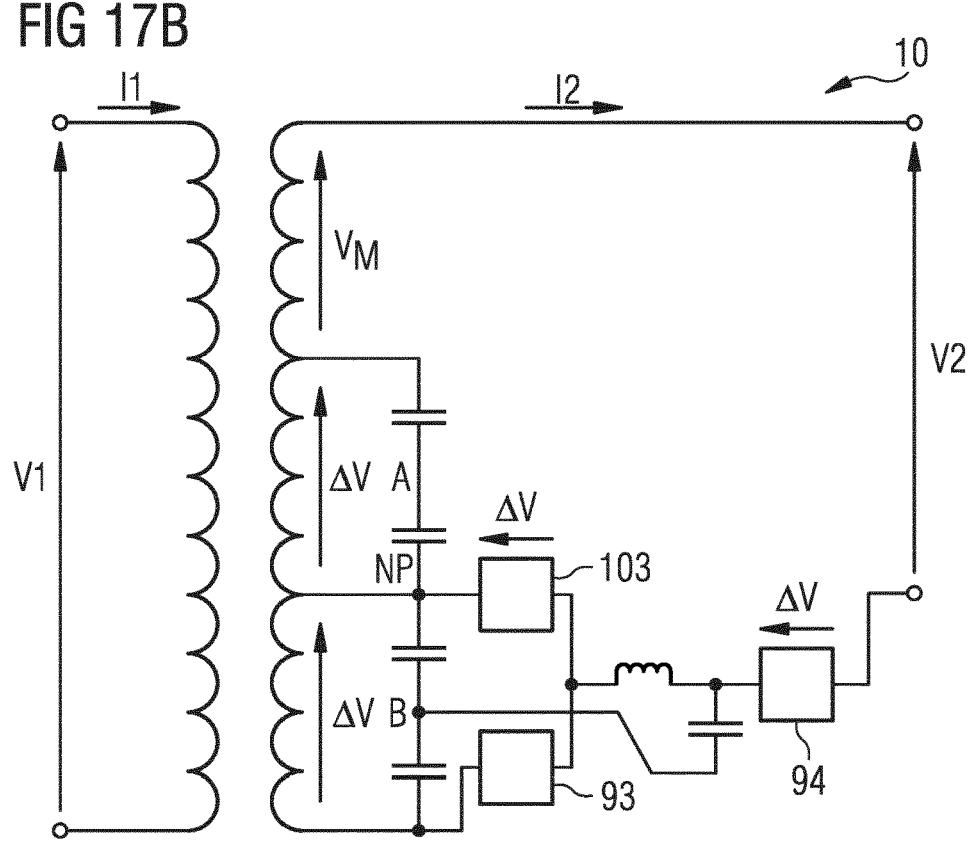

FIGS. 17A and 17B show example modes of a transformer arrangement 10 of FIG. 14D. Input and output capacitors can be replaced by capacitors connected in series with resistors (see FIGS. 3E and 3F).

As shown in FIG. 17A, the second voltage V2 should be in the range 0.9 to 1 p.u. The HF parts 95, 104 of the second and the fourth arm 32, 100 are switching to regulate the second voltage V2. The second LF part 94 of the second arm 32 is continuously on.

In FIG. 17B, the second voltage V2 should be in the range 1.0 to 1.1 p.u. The HF parts 93, 103 of the first and the third arm 31, 33 are switching to regulate the second voltage V2. The first LF part 92 of the first third arm 31 is continuously on.

The embodiments shown in the FIGS. 1 to 17B as stated represent example embodiments of the improved transformer arrangement and method for voltage conversion; thus, they do not constitute a complete list of all embodiments according to the improved transformer arrangement and method for voltage conversion. Actual transformer arrangements and methods may vary from the embodiments shown in terms of arrangements, devices, circuits, cells and voltages for example.

This patent application claims the priority of European patent application 20200063.4, the disclosure content of which is hereby incorporated by reference.

In the following text, further aspects of the present disclosure are specified. The individual aspects are enumerated in order to facilitate the reference to features of other aspects.

1. Transformer arrangement, comprising
   a first and a second arrangement side (11, 12),
   a transformer (13) with first windings (14) coupled to the first arrangement side (11) and with second windings (15) having a first to a fourth tap (17 to 20),
   a converter (22) coupling the first, the second and the third tap (17 to 19) to the second arrangement side (12),
   a first filter circuit (34) coupling the first tap (17) to the third tap (19), and
   a second filter circuit (35) coupling the third tap (19) to the second tap (18).

2. Transformer arrangement of aspect 1,
   wherein the converter (22) comprises
   a first arm (31) comprising a first number of cells (29) and a first terminal connected to the first tap (17),
   a second arm (32) comprising a second number of cells (29) and a first terminal connected to the second tap (18), and
   a third arm (33) comprising a third number of cells (29) and a first terminal connected to the third tap (19).

3. Transformer arrangement of aspect 2,
   wherein the transformer arrangement (10) comprises an filter circuitry (23), and
   wherein a second terminal of the first arm (31), a second terminal of the second arm (32) and a second terminal of the third arm (33) are coupled via the filter circuitry (23) to a first terminal (24) of the second arrangement side (12).

4. Transformer arrangement of aspect 3,
   wherein the filter circuitry (23) includes a capacitive element (91) connected to the third tap (19).

5. Transformer arrangement of aspect 2,
   wherein the converter (22) comprises a fourth arm (100) comprising a fourth number of cells (29) and a first terminal connected to the third tap (19),
   wherein a second terminal of the third arm (33) is connected to a node of the first arm (31),
   wherein a second terminal of the fourth arm (100) is connected to a node of the second arm (32), and wherein a second terminal of the first arm (31) and a second terminal of the second arm (32) are coupled to a first terminal (24) of the second arrangement side (12).

6. Transformer arrangement of aspect 5,
   wherein the first arm (31) includes a first internal filter (97) and the second arm (32) includes a second internal filter (98).

7. Transformer arrangement of one of aspects 2 to 6,
   wherein the third number of cells (29) is less than the first number of cells (29) and is less than the second number of cells (29).

8. Transformer arrangement of one of aspects 2 to 7,
   wherein the first number of cells (29) is equal to the second number of cells (29).

9. Transformer arrangement of one of aspects 2 to 8,
   wherein a cell (29) comprises a device of a group comprising a metal-oxide-semiconductor field-effect transistor, an insulated-gate bipolar transistor, a thyristor and a bi-mode insulated gate transistor.

10. Transformer arrangement of one of aspects 2 to 9,
    wherein the first number of cells (29) of the first arm (31) include at least a cell of a first type (29') and a cell of a second type (29"), and
    wherein the second number of cells (29) of the second arm (32) include at least a cell of a first type (29') and a cell of a second type (29").

11. Transformer arrangement of one of aspects 1 to 10,
    wherein the transformer arrangement (10) comprises a by-pass switch (50) coupling a first terminal (24) of the second arrangement side (24) to one tap of a group comprising the first, the second and the third tap (17 to 19).

12. Transformer arrangement of one of aspects 1 to 11,
    wherein the transformer arrangement (10) comprises
    a box (80) in which the converter (22) is arranged and
    a tank (81) in which the transformer (13) and the box (80) are arranged.

13. Transformer arrangement of one of aspects 1 to 11,
    wherein the transformer arrangement (10) comprises
    a box (80) in which the converter (22) is arranged,
    a tank (81) in which the transformer (13) is arranged and
    bushings (82 to 84) that couple at least the first, the second and the third tap (17 to 19) to the converter (22).

14. Method for voltage conversion, comprising
    providing a first voltage (V1) to first windings (14) of a transformer (13),
    generating voltages at a first to a fourth tap (17 to 19) of second windings (15) of the transformer (13),
    providing a second voltage (V2) by a converter (22) coupled to the first, the second and the third tap (17 to 19),
    filtering a voltage between the first tap (17) and the third tap (19) by a first filter circuit (34), and
    filtering a voltage between the third tap (19) and the second tap (18) by a second filter circuit (35)

LIST OF REFERENCE SIGNS 10 transformer arrangement
11 first arrangement side
12 second arrangement side
13 transformer
14 first windings
15 second windings 17 first tap
18 second tap
19 third tap
20 fourth tap
21 filter arrangement
22 converter
23 filter circuitry
24 first terminal
25 second terminal
29 cell
30 matrix
31 first arm
32 second arm
33 third arm
34 first filter circuit
35 second filter circuit
36, 37 capacitor
40 switch
41, 42 device
43 snubber filter
44 device
45 resistor
50 by-pass switch
51, 52 switch
54 ground
55 further transformer
56, 57 windings
58 to 61 tap
62 further converter
63 third terminal
70 additional transformer
71, 72 windings
73 to 76 taps
77 additional converter
78 fourth terminal
80 box
81 tank
82 to 84 bushing
90, 90' inductive element
91, 91' capacitive element
92 first LF part
93 first HF part
94 second LF part
95 second HF part
96 third HF part
97 first internal filter
98 second internal filter
99 LF part
100 fourth arm
101 LF part
102 internal filter
103, 104 HF part
106 to 109 filter element
A, B point
a, b, c phase
DV, DV1, DV4 difference voltage
DV6 difference voltage
I1 first current
I2 second current
N, n neutral phase
NP neutral point
V1 first voltage
V2 second voltage
V2min, V4min minimum voltage
V6min minimum voltage
V3 to V6 voltage

The invention claimed is:

1. A transformer arrangement, comprising,
a first and a second arrangement side,
a transformer with first windings coupled to the first arrangement side and with second windings having a first to a fourth tap,
a converter coupling the first, the second and the third tap to the second arrangement side,
a first filter circuit coupling the first tap to the third tap, and
a second filter circuit coupling the third tap to the second tap, wherein the converter comprises,
a first arm comprising a first number of cells and a first terminal connected to the first tap,
a second arm comprising a second number of cells and a first terminal connected to the second tap, and
a third arm comprising a third number of cells and a first terminal connected to the third tap, and
wherein the third number of cells is less than the first number of cells and is less than the second number of cells,
wherein the first arm comprises a first low frequency (LF) part and a first high frequency (HF) part,
wherein the second arm comprises a second LF part and a second HF part,
wherein the third arm comprises a third HF part,
wherein a first internal filter of the converter couples a node between the first LF part and the first HF part to a neutral point (NP), and
wherein a second internal filter of the converter couples a node between the second LF part and the second HF part to the neutral point (NP).

2. The transformer arrangement of claim 1,
wherein the transformer arrangement comprises an output of the filter circuit, and
wherein a second terminal of the first arm, a second terminal of the second arm and a second terminal of the third arm are coupled via the output filter circuit to a first terminal of the second arrangement side.

3. The transformer arrangement of claim 2,
wherein the output filter circuit includes a capacitive element connected to the third tap.

4. The transformer arrangement of claim 1,
wherein the first number of cells is equal to the second number of cells.

5. The transformer arrangement of claim 1,
wherein a cell comprises a device of a group comprising a metal-oxide-semiconductor field-effect transistor, an insulated-gate bipolar transistor, a thyristor and a bi-mode insulated gate transistor.

6. The transformer arrangement of claim 1,
wherein the first number of cells of the first arm include at least a cell of a first type and a cell of a second type, and
wherein the second number of cells of the second arm include at least a cell of a first type and a cell of a second type,
wherein the cell of the first type is configured for operation at higher frequencies as the cell of the second type.

7. The transformer arrangement of claim 1,
wherein the transformer arrangement comprises a by-pass switch coupling a first terminal of the second arrangement side to one tap of a group comprising the first, the second and the third tap.

8. The transformer arrangement of claim 1,
wherein the transformer arrangement comprises,
a box in which the converter is arranged, and a tank in which the transformer and the box are arranged.

9. The transformer arrangement of claim 1, wherein the transformer arrangement comprises,
a box in which the converter is arranged,
a tank in which the transformer is arranged, and
bushings that couple at least the first, the second and the third tap to the converter.

10. A transformer arrangement, comprising,
a first and a second arrangement side,
a transformer with first windings coupled to the first arrangement side and with second windings having a first to a fourth tap,
a converter coupling the first, the second and the third tap to the second arrangement side,
a first filter circuit coupling the first tap to the third tap, and
a second filter circuit coupling the third tap to the second tap, wherein the converter comprises,
a first arm comprising a first number of cells and a first terminal connected to the first tap,
a second arm comprising a second number of cells and a first terminal connected to the second tap, and
a third arm comprising a third number of cells and a first terminal connected to the third tap, and
wherein the third number of cells is less than the first number of cells and is less than the second number of cells,
wherein the converter comprises a fourth arm comprising a fourth number of cells and a first terminal connected to the third tap,
wherein a second terminal of the third arm is connected to a node of the first arm,
wherein a second terminal of the fourth arm is connected to a node of the second arm, and
wherein a second terminal of the first arm and a second terminal of the second arm are coupled to a first terminal of the second arrangement side,
wherein the node of the first arm is located between a first low frequency (LF) part of the first arm and a first high frequency (HF) part of the first arm, and
wherein the node of the second arm is arranged between a second LF part of the second arm and a second HF part of the second arm.

11. The transformer arrangement of claim 10, wherein the first arm includes a first internal filter and the second arm includes a second internal filter.

12. A transformer arrangement, comprising,
a first and a second arrangement side,
a transformer with first windings coupled to the first arrangement side and with second windings having a first to a fourth tap,
a converter coupling the first, the second and the third tap to the second arrangement side,
a first filter circuit coupling the first tap to the third tap, and
a second filter circuit coupling the third tap to the second tap, wherein the converter comprises,
a first arm comprising a first number of cells and a first terminal connected to the first tap,
a second arm comprising a second number of cells and a first terminal connected to the second tap,
a third arm comprising a third number of cells and a first terminal connected to the third tap, and
wherein the transformer arrangement comprises an output filter circuit, and wherein a second terminal of the first arm, a second terminal of the second arm and a second terminal of the third arm are coupled via the output filter circuit to a first terminal of the second arrangement side, and
wherein the output filter circuit includes a capacitive element connected to the third tap
wherein the first arm comprises a first low frequency (LF) part and a first high frequency (HF) part,
wherein the second arm comprises a second LF part and a second HF part,
wherein the third arm comprises a third HF part,
wherein a first internal filter of the converter couples a node between the first LF part and the first HF part to a neutral point (NP), and
wherein a second internal filter of the converter couples a node between the second LF part and the second HF part to the neutral point (NP).

13. A transformer arrangement, comprising,
a first and a second arrangement side,
a transformer with first windings coupled to the first arrangement side and with second windings having a first to a fourth tap,
a converter coupling the first, the second and the third tap to the second arrangement side,
a first filter circuit coupling the first tap to the third tap, and
a second filter circuit coupling the third tap to the second tap, wherein the converter comprises,
a first arm comprising a first number of cells and a first terminal connected to the first tap,
a second arm comprising a second number of cells and a first terminal connected to the second tap,
a third arm comprising a third number of cells and a first terminal connected to the third tap,
wherein the filter circuitry includes a capacitive element connected to the third tap,
wherein the transformer arrangement comprises an output filter circuit,
wherein a second terminal of the first arm, a second terminal of the second arm and a second terminal of the third arm are coupled via the output filter circuit to a first terminal of the second arrangement side, and
wherein the converter comprises a fourth arm comprising a fourth number of cells and a first terminal connected to the third tap,
wherein a second terminal of the third arm is connected to a node of the first arm,
wherein a second terminal of the fourth arm is connected to a node of the second arm, and
wherein a second terminal of the first arm and a second terminal of the second arm are coupled to a first terminal of the second arrangement side,
wherein the node of the first arm is located between a first low frequency (LF) part of the first arm and a first high frequency (HF) part of the first arm, and
wherein the node of the second arm is arranged between a second LF part of the second arm and a second HF part of the second arm.

14. The transformer arrangement of claim 13, wherein the first arm includes a first internal filter and the second arm includes a second internal filter.

15. The transformer arrangement of claim 14, wherein the first number of cells is equal to the second number of cells.

16. The transformer arrangement of claim 15, wherein a cell comprises a device of a group comprising a metal-oxide-semiconductor field-effect transistor, an insulated-gate bipolar transistor, a thyristor and a bi-mode insulated gate transistor.

\* \* \* \* \*